United States Patent
Iwamura

(10) Patent No.: US 7,930,544 B2
(45) Date of Patent: Apr. 19, 2011

(54) DATA PROCESSING APPARATUS AND ITS METHOD

(75) Inventor: Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 753 days.

(21) Appl. No.: 11/574,089

(22) PCT Filed: Oct. 25, 2005

(86) PCT No.: PCT/JP2005/019942
§ 371 (c)(1), (2), (4) Date: Feb. 22, 2007

(87) PCT Pub. No.: WO2006/046724
PCT Pub. Date: May 4, 2006

(65) Prior Publication Data
US 2008/0276095 A1    Nov. 6, 2008

(30) Foreign Application Priority Data

Oct. 28, 2004  (JP) .................................. 2004-314717
Oct. 28, 2004  (JP) .................................. 2004-314718

(51) Int. Cl.
    *H04L 9/32* (2006.01)
(52) U.S. Cl. ........ 713/176; 713/180; 713/181; 380/259; 380/283; 348/161
(58) Field of Classification Search ............... 713/179, 713/176, 180, 181; 348/161, 207.99, 207.1, 348/211.1, 231.2; 380/201, 202, 203, 246, 380/259, 260, 262, 283
See application file for complete search history.

(56) References Cited

U.S. PATENT DOCUMENTS

| | | | |
|---|---|---|---|
| 5,227,613 A * | 7/1993 | Takagi et al. | 235/380 |
| 5,499,294 A | 3/1996 | Friedman | |
| 6,275,936 B1 * | 8/2001 | Kyojima et al. | 713/182 |
| 7,046,807 B2 * | 5/2006 | Hirano et al. | 380/234 |
| 7,139,407 B2 | 11/2006 | Wakao | |
| 7,162,637 B2 | 1/2007 | Wakao et al. | 713/176 |
| 2003/0123443 A1 | 7/2003 | Anwar | |
| 2003/0123699 A1 * | 7/2003 | Wakao et al. | 382/100 |
| 2006/0253448 A1 | 11/2006 | Tagashira et al. | 707/9 |
| 2007/0172256 A1 | 7/2007 | Iwamura | 399/130 |

FOREIGN PATENT DOCUMENTS

| | | |
|---|---|---|
| JP | 11-122240 | 4/1999 |
| JP | 2003-198540 | 7/2003 |
| JP | 2003-198543 | 7/2003 |
| JP | 2003-198834 | 7/2003 |

* cited by examiner

*Primary Examiner* — Matthew T Henning
*Assistant Examiner* — Daniel Potratz
(74) *Attorney, Agent, or Firm* — Fitzpatrick, Cella, Harper & Scinto

(57) ABSTRACT

A verification information generation system includes first and second data processing apparatuses. The first data processing apparatus has a unit holding first secret information, a unit receiving information associated with the second secret information from the second apparatus, a unit generating key information on the basis of the first secret information and the information associated with the second secret information, a unit generating key derivation auxiliary information allowing the key information to be derived from the second secret information, a unit generating verification information on the basis of information to be verified and the key information, and a unit outputting the information to be verified, the verification information, and the key derivation auxiliary information. The second secret information is information which is set in advance in the second data processing apparatus.

9 Claims, 19 Drawing Sheets

DATA PROCESSING APPARATUS AND ITS METHOD

TECHNICAL FIELD

The present invention relates to a digital data falsification detection technique.

BACKGROUND ART

In recent years, digital cameras have become more and more popular. Since an image captured by a digital camera can be stored and held as digital image data, the merits of this type of camera are notable, such as keeping an image from aging, allowing easy storage and retrieval, allowing data transmission to a remote place via a communication line, and so forth. In addition, it reduces development and print labor, unlike conventional silver halide photos. For these reasons, digital cameras are used in many business fields.

For example, in the non-life insurance industry, damage to an accident vehicle can be captured by a digital camera and then an accident assessment can be made based on the captured image, and in the construction industry, the image of a construction site can be captured to confirm the progress of the construction. The Ministry of Land Infrastructure and Transport already permits the use of images captured by digital cameras to record civil engineering sites.

However, digital images also have disadvantages. Using a commercially available application program, such as a photo retouch tool or the like, digital images can be easily processed and modified on a personal computer. Since processing and modifications are easy, the credibility of an image captured by a digital camera is recognized to be lower than that of a silver halide photo in an accident situation or in a report that cites a digital image as proof.

It is not impossible to alter an image of a silver halide photo. However, since its cost is relatively high and the alteration result is often unnatural, alterations are rarely performed in practice. This is why silver halide photos are often adopted as proof of what they show. Therefore, in order to overcome this problem of authentication in the non-life insurance industry and the construction industry, a validation method is required for digital image data.

Nowadays, falsification detection systems for image data based on a digital signature exploiting encryption technology has been proposed (U.S. Pat. No. 5,499,294).

This system comprises an image generation apparatus (camera) for generating image data, and an image verification apparatus for verifying the validity (non-alteration) of the image data. The camera executes a predetermined arithmetic operation on the basis of secret information unique to a camera and the captured digital image data, and generates digital signature data as identification information of the image data (to detect falsification). The camera outputs the digital signature data and the image data. The image verification apparatus verifies the authenticity by comparing the data resulting from the application of a predetermined arithmetic operation to the image data, and the data obtained by applying the inverse arithmetic operation on the generated digital signature data. In the above patent, a hash function (compression function) and public-key cryptography are used to generate the digital signature data.

A MAC (Message Authentication Code) is often used in place of digital signature data. A MAC is generated either by using symmetric-key cryptography, and a hash function, or the like, and is characterized in that its processing speed is higher than the public-key cryptography. Since identical symmetric-keys are used in the generation and the verification of the MAC, the symmetric-keys must be strictly controlled by both the camera and the image verification apparatus.

Image data captured by a camera is normally stored in a compact memory card (non-volatile memory) connected to the camera. Memory cards usually comprise flash EEPROMs. Recent miniaturization techniques have shrunk the size of memory cards to no more than 4-cm$^2$ and to a height of about 2 to 3 mm Its storage capacity has also been multiplied by several hundred Mbytes. Furthermore, a memory card or IC card, which has an arithmetic unit including a CPU, a RAM, and a ROM in addition to the flash EEPROM and implements a security function, is now available on the market. Using its arithmetic function, the memory card or IC card, as an external device to the camera, can generate the required for falsification detection of image data and the like.

A system that detects falsification of image data using a MAC within the image generation apparatus such as a camera or the like will be examined below. In the following examination, assume that an IC card verifies the presence/absence of falsification of the image data. The MAC has a scheme for generating and verifying verification data using symmetric-key cryptography, as described above, and cannot assure security if the symmetric key is discovered by outside parties. Therefore, identical symmetric keys must be stored in secret in the camera on the generation side, and in the IC card on the verification side. How to share/set the symmetric keys on the generation and verification sides of the authentication mechanism will be examined. In this case, the following two arrangements are possible.

1. The user generates a symmetric key, and sets it in the camera and the IC card.
2. A vendor generates a symmetric key, and sets it in the camera and the IC card.

In these cases, the following problems occur.

1. Since the user who sets the symmetric key knows the symmetric key, only he/she can falsify image data. Therefore, no proof of non-falsification of camera images described in the prior art can be attained. Since the content of IC cards are different for respective users, one IC card cannot verify another camera. This is very inconvenient in practical use.
2. If the vendor protects the key set secret, the symmetric key should never be discovered by outside parties, and a user should never be aware of it, resulting in higher security. However, the production process is complicated when different symmetric keys are set for respective pairs of cameras and IC cards. For this reason, identical symmetric keys may be set in all pairs of cameras and verification apparatuses. In this case, if the symmetric key of one camera is uncovered, all cameras are subject to their images being falsified without detection. Also, old verification data can be falsified, and its validity becomes threatened.

DISCLOSURE OF INVENTION

The present invention has been developed in consideration of the aforementioned problems, and has as its object to provide a technique that makes falsification difficult while minimizing the operation load on the vendor and the user.

In order to achieve the above object, for example, a verification information generation system according to the present invention comprises the following arrangement. That is, a verification information generation system is provided comprising a first and a second data processing apparatuses, wherein
the first data processing apparatus comprises:

a holding unit adapted to hold a first secret information which is set in advance in the first data processing apparatus;

a reception unit adapted to receive information associated with the second secret information from the second data processing apparatus;

a key information generation unit adapted to generate key information on the basis of the first secret information and the information associated with the second secret information;

a key derivation auxiliary information generation unit adapted to generate key derivation auxiliary information which allows the key information to be derived from the second secret information;

a verification information generation unit adapted to generate verification information on the basis of information to be verified and the key information; and an output unit adapted to output the information to be verified, the verification information, and the key derivation auxiliary information, and the second secret information is information which is set in advance in the second data processing apparatus.

In order to achieve the above object, for example, a falsification detection system according to the present invention comprises the following arrangement. That is, a falsification detection system is provided comprising a first and a second data processing apparatus, wherein the second data processing apparatus comprises:

a holding unit adapted to hold second secret information which is set in advance in the second data processing apparatus;

a reception unit adapted to receive verification information associated with information to be verified, and key derivation auxiliary information from the first data processing apparatus;

a key information derivation unit adapted to derive key information on the basis of the second secret information and the key derivation auxiliary information; and a falsification detection unit adapted to detect the presence/absence of falsification of the information to be verified on the basis of the verification information and the key information, and the verification information is generated using the first secret information set in advance in the first data processing apparatus.

Note that information to be managed in secret is called secret information in the above description.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Preferred embodiments of the present invention will be described in detail hereinafter with reference to the accompanying drawings. Note that building components described in the embodiments are merely examples, and the scope of the present invention is not limited to those.

First Embodiment

Figure 1:
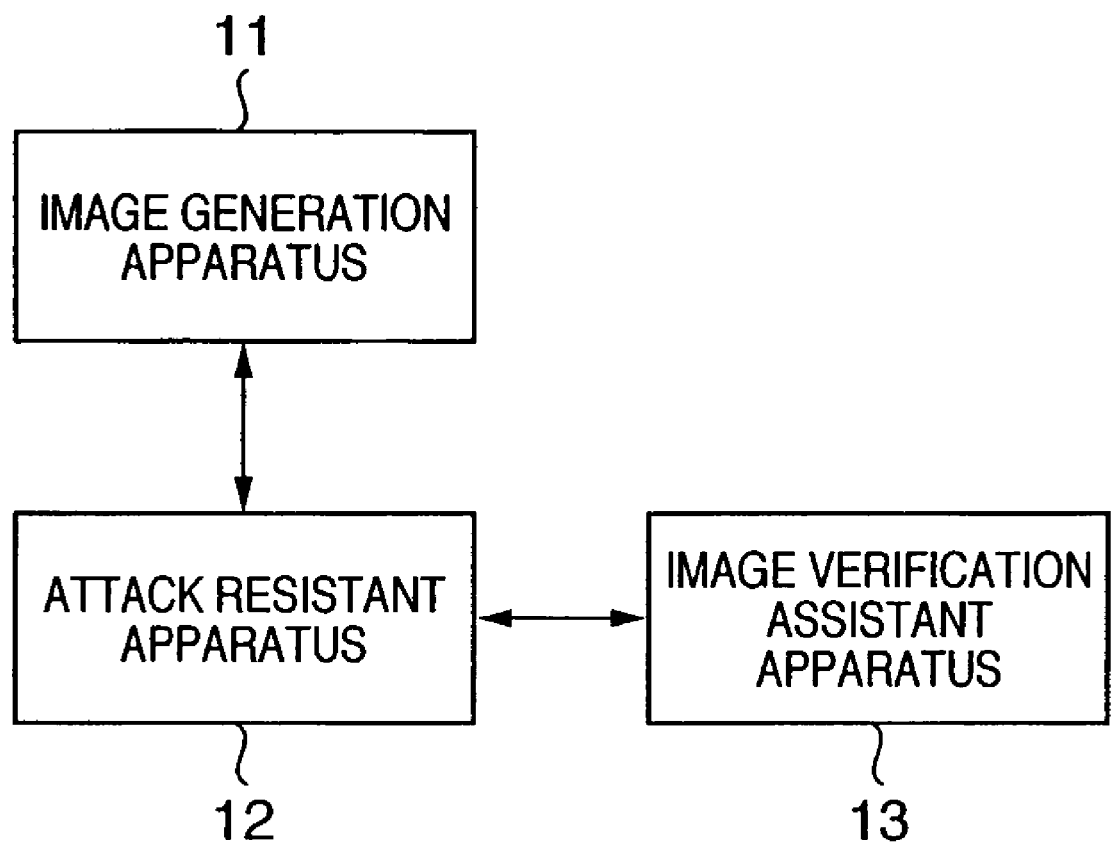
FIG. 1 is a block diagram for explaining an example of the arrangement of an image verification system according to an embodiment of the present invention.

FIG. 1 is a block diagram showing a system according to this embodiment. As shown in FIG. 1, this system comprises an image generation apparatus 11 which generates image data to be validated, and also its verification data, an image verification assistant apparatus 13, and an attack resistant apparatus 12 which can communicate with these apparatuses.

The image generation apparatus 11 has a function of setting a key for MAC generation, a function of generating/capturing image data, a function of generating MAC data for the generated image data, a function of generating auxiliary parameters (for example, in case of a camera, an image capturing time, the focal length, the aperture value, the ISO speed, the photometry mode, the image file size, the photographer information, etc.), a function of generating an image file with MAC data (including image data, MAC data, auxiliary parameters, and the like), and a function of communicating with the attack resistant apparatus 12. Note that the image generation apparatus 11 may be either an image capturing apparatus such as a digital camera, a digital video camera, a scanner, or the like, or an electronic apparatus with a camera unit. For the sake of simplicity, the image generation apparatus 11 will be described as a camera (digital camera) hereinafter.

The attack resistant apparatus 12 has a function of storing information required to generate/verify verification data, a function of calculating information required for verification, and a function of communicating with the image generation apparatus 11 and image verification assistant apparatus 13 to transmit data thereto and receive data therefrom. Note that the attack resistant apparatus 12 is a memory card or an IC card with a security function, which has an arithmetic unit including a CPU, a RAM, and a ROM in addition to a flash EEPROM. For the sake of simplicity, the attack resistant apparatus 12 will be described as an IC card hereinafter.

The image verification assistant apparatus 13 has a function of separating an image file from MAC data, a function of calculating a hash value of the separated image data, a function of communicating with the attack resistant apparatus 12, and a function of displaying a determination result. Note that the image verification assistant apparatus 13 may be either a PC which can store and distribute data like a Web server, or a compact apparatus having a CPU, memory, and the like. For the sake of simplicity, the image verification assistant apparatus 13 will be described as a PC hereinafter.

Figure 2:
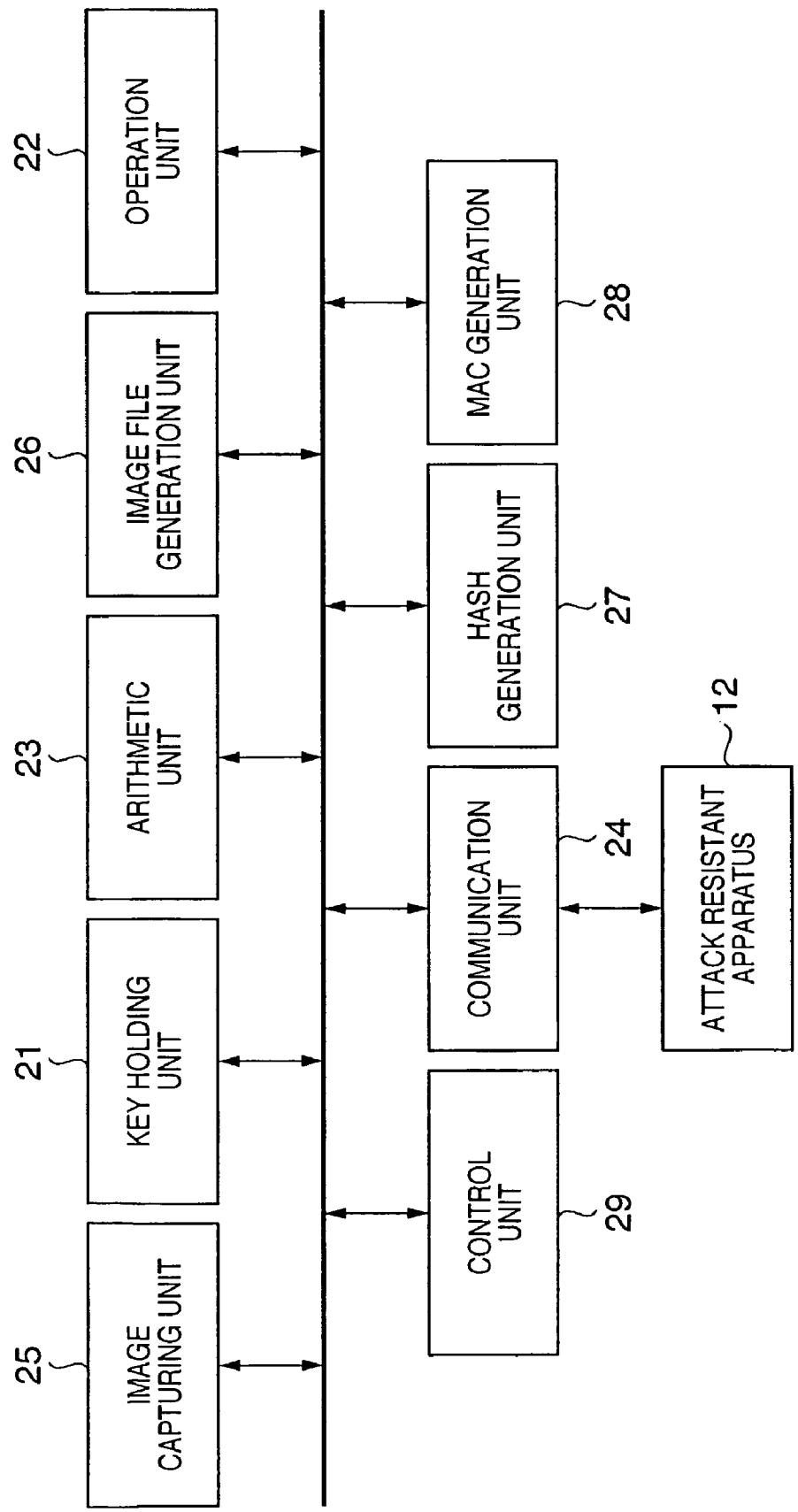
FIG. 2 is a block diagram showing the principal functional arrangement of an image generation apparatus 11 according to the embodiment of the present invention.

FIG. 2 is a block diagram of the camera 11 according to this embodiment. Referring to FIG. 2, reference numeral 22 denotes an operation unit which is a user interface unit including switches, a panel, and the like used to set various parameters in the camera, to issue an image capturing instruction of an object, and the like. Reference numeral 25 denotes an image capturing unit which has an optical sensor such as a CCD (charge coupled device) or the like, and generates image data of an object and auxiliary parameters in accordance with an instruction input to the operation unit 22. Reference numeral 21 denotes a key holding unit which comprises a writable non-volatile memory. Reference numeral 23 denotes an arithmetic unit (which comprises a CPU, RAM, and ROM, a dedicated IC chip, or the like), which performs predetermined arithmetic operations in accordance with a request from a control unit 29. Reference numeral 26 denotes an image file generation unit which generates an image file of a predetermined format from the captured image, and writes it in a detachable memory card (not shown). Reference numeral 29 denotes a control unit for controlling the overall apparatus; reference numeral 27 denotes a hash generation unit for calculating a hash value; and reference numeral 28 denotes a MAC generation unit. Reference numeral 24 denotes a communication unit for communicating with the IC card (attack resistant apparatus) 12.

Figure 4:
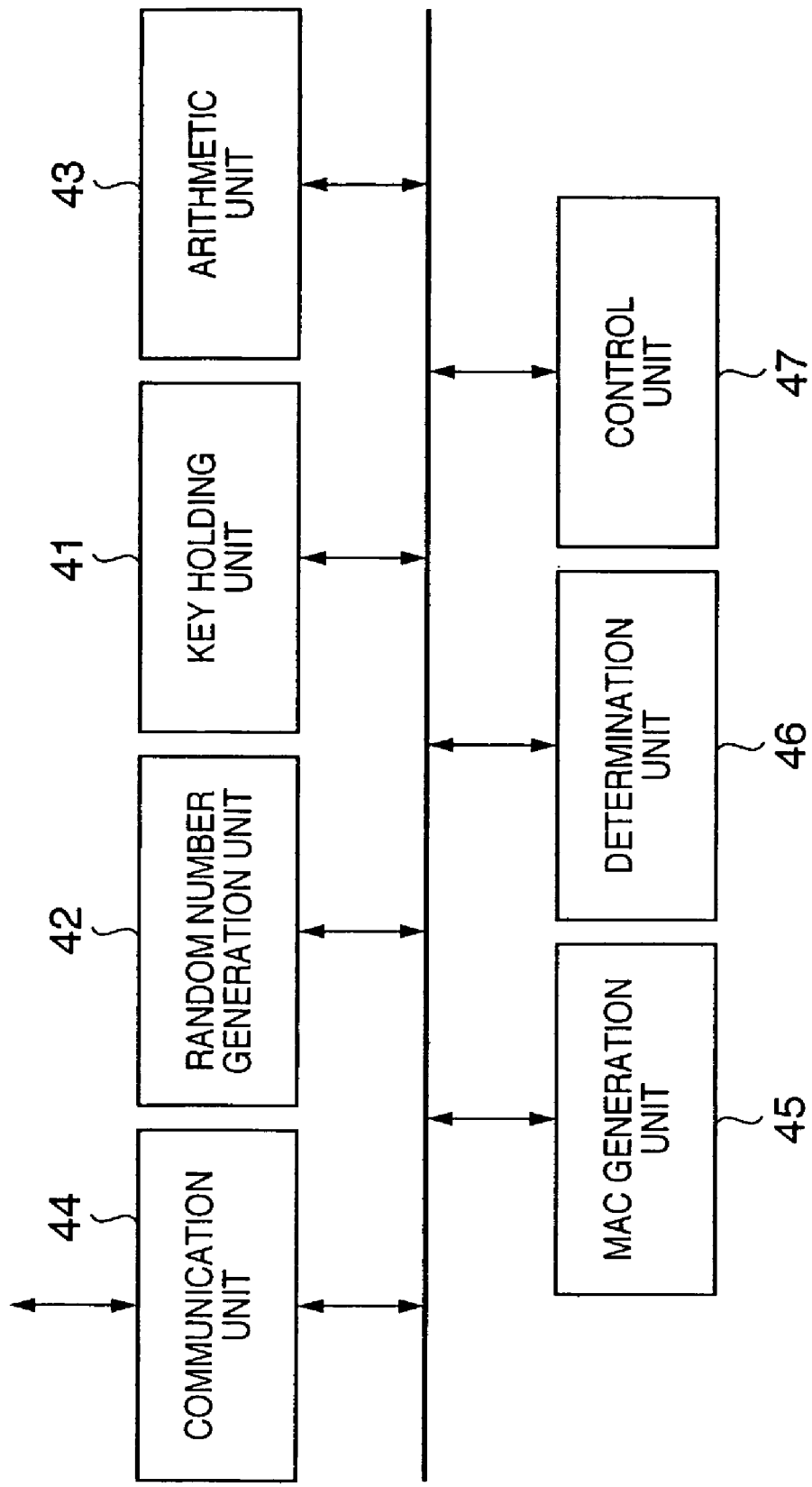
FIG. 4 is a block diagram for explaining the principal functional arrangement of an attack resistant apparatus 12 according to the embodiment of the present invention.

FIG. 4 is a block diagram of the IC card 12 according to this embodiment. Referring to FIG. 4, reference numeral 41 denotes a key holding unit which comprises a writable non-volatile memory; and reference numeral 43 denotes an arithmetic unit which performs predetermined arithmetic operations in accordance with a request from a control unit 47. Reference numeral 42 denotes a random number generation unit which generates a random number by a predetermined algorithm in accordance with a request from the control unit 47; and reference numeral 45 denotes a MAC generation unit which generates a MAC. Reference numeral 47 denotes a control unit which controls the overall apparatus; reference numeral 46 denotes a determination unit which determines the validity of image data; and reference numeral 44 denotes a communication unit which communicates with other apparatuses.

Figure 6:
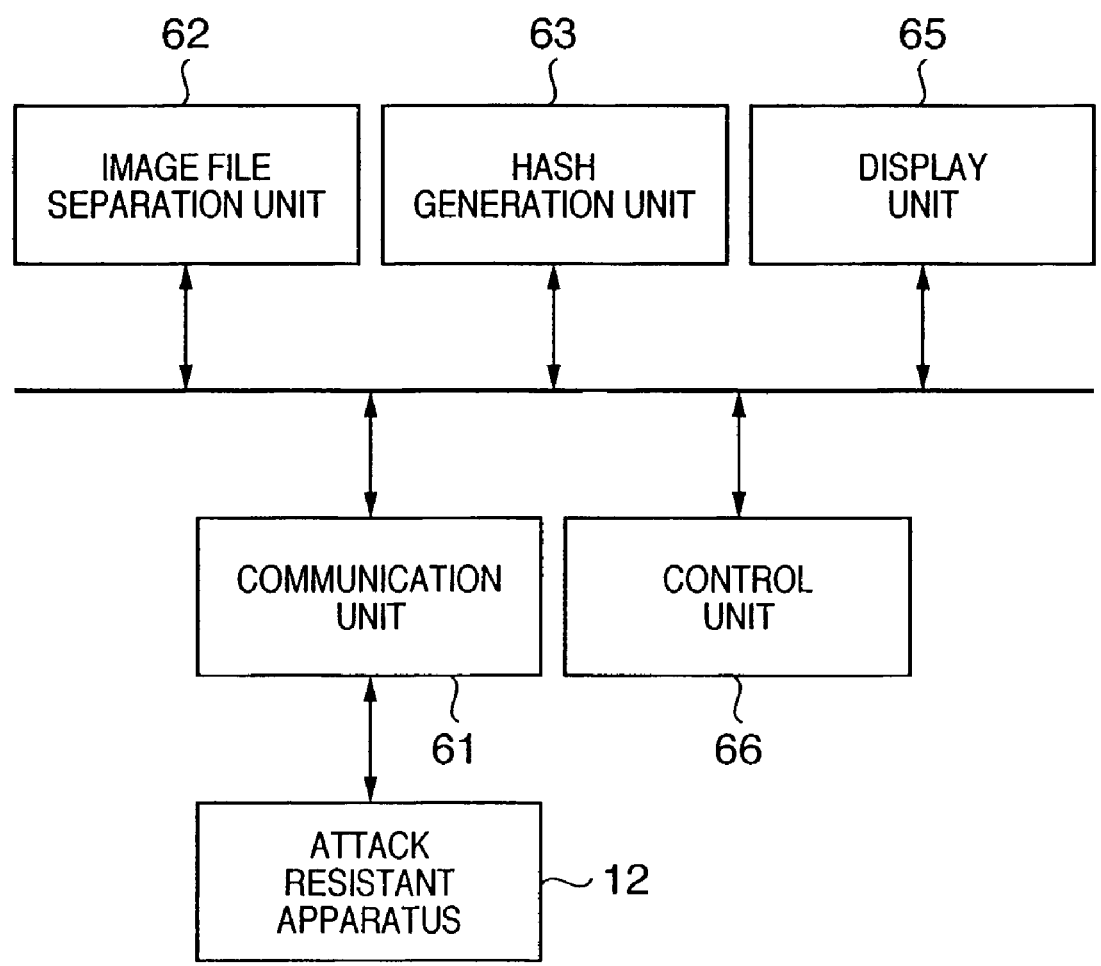
FIG. 6 is a block diagram showing the principal functional arrangement of an image verification assistant apparatus 13 according to the embodiment of the present invention.

FIG. 6 is a functional block diagram of the PC (image verification assistant apparatus) 13 according to this embodiment. Since the image verification assistant apparatus 13 comprises a PC, as described above, and the arrangement of the PC need not be explained, FIG. 6 shows the arrangement when a program that serves as the image verification assistant apparatus is running That is, function units shown in FIG. 6 are implemented by a CPU and programs for executing corresponding processes.

Referring to FIG. 6, reference numeral 62 denotes an image file separation unit which separates image data and verification data (including a MAC) from an image file; reference numeral 63 denotes a hash generation unit; and reference numeral 65 denotes a display unit for displaying a validation result (indicating whether or not image data has been falsified). Reference numeral 61 denotes a communication unit which communicates with the IC card (attack resistant apparatus); and reference numeral 66 denotes a control unit which controls the overall apparatus.

In the above arrangement, assume that the camera 11 stores predetermined secret information A in the key holding unit 21 during its production process. This secret information A is common to all cameras provided by the vendor. Note that the secret information A, and ai and Ai to be described later represent numerical values, and are set as numerical values having a predetermined bit length. Note that the key holding unit 21 adopts an arrangement that inhibits data from being read out to external units except for the arithmetic unit 23, so as to prevent key information leakage.

Likewise, assume that the IC card 12 has predetermined secret information B in the key holding unit 41 that is stored during its production process. This secret information B is common to all IC cards provided by the vendor. Note that the secret information B represents a numerical value, and is set as a numerical value having a predetermined bit length. Note that the key holding unit 41 adopts an arrangement that inhibits data from being read out to external units except for the arithmetic unit 43, so as to prevent key information leakage.

Figure 3:
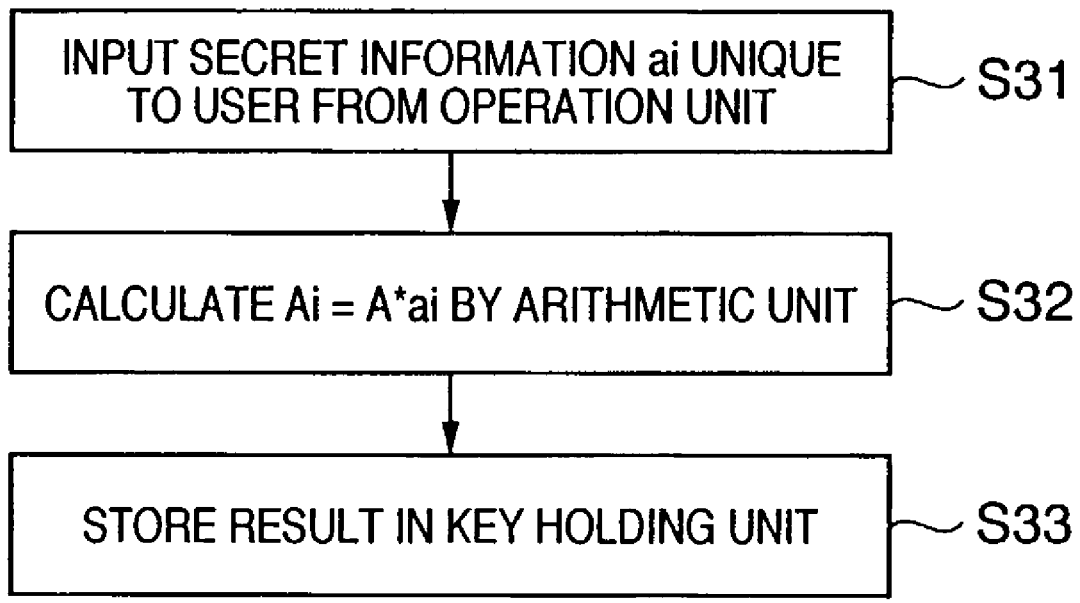
FIG. 3 is a flowchart for explaining key individualizing processing according to the embodiment of the present invention.

Next, key individualizing processing for individualizing the camera using secret information ai unique to each user or camera will be described below using FIG. 3. FIG. 3 is a flowchart showing the flow of the key individualizing processing. The key individualizing processing includes an input operation of arbitrary unique data ai by the user to the camera via the operation unit 22, and the next arithmetic operation of the arithmetic unit 23.

Secret information ai unique to the user is input from the operation unit 22 (step S31). The information ai is, for example, an alphanumeric character string, and is input by a simple operation on the switches, panel, and the like which form the operation unit 22. The control unit 29 of the camera 11 controls the arithmetic unit 23 to calculate Ai=A×ai using the stored A and input ai (step S32). The control unit 29 controls the aforementioned key holding unit 21 to store the result (step S33).

As described above, Ai is the result of the arithmetic operation using A and ai. Since A is common secret information determined by the vendor and ai is information that only the user knows, it is noted that a third party (including the vendor) cannot know the value Ai, and the user himself or herself cannot know the value Ai, either.

Note that the camera 11 may further comprise a random number generation unit for generating a random number, and ai may be generated based on this random number generation unit at the first time of use or the like by the user. In this embodiment, there is no entity that can know ai, and the security can be further improved.

Figure 5:
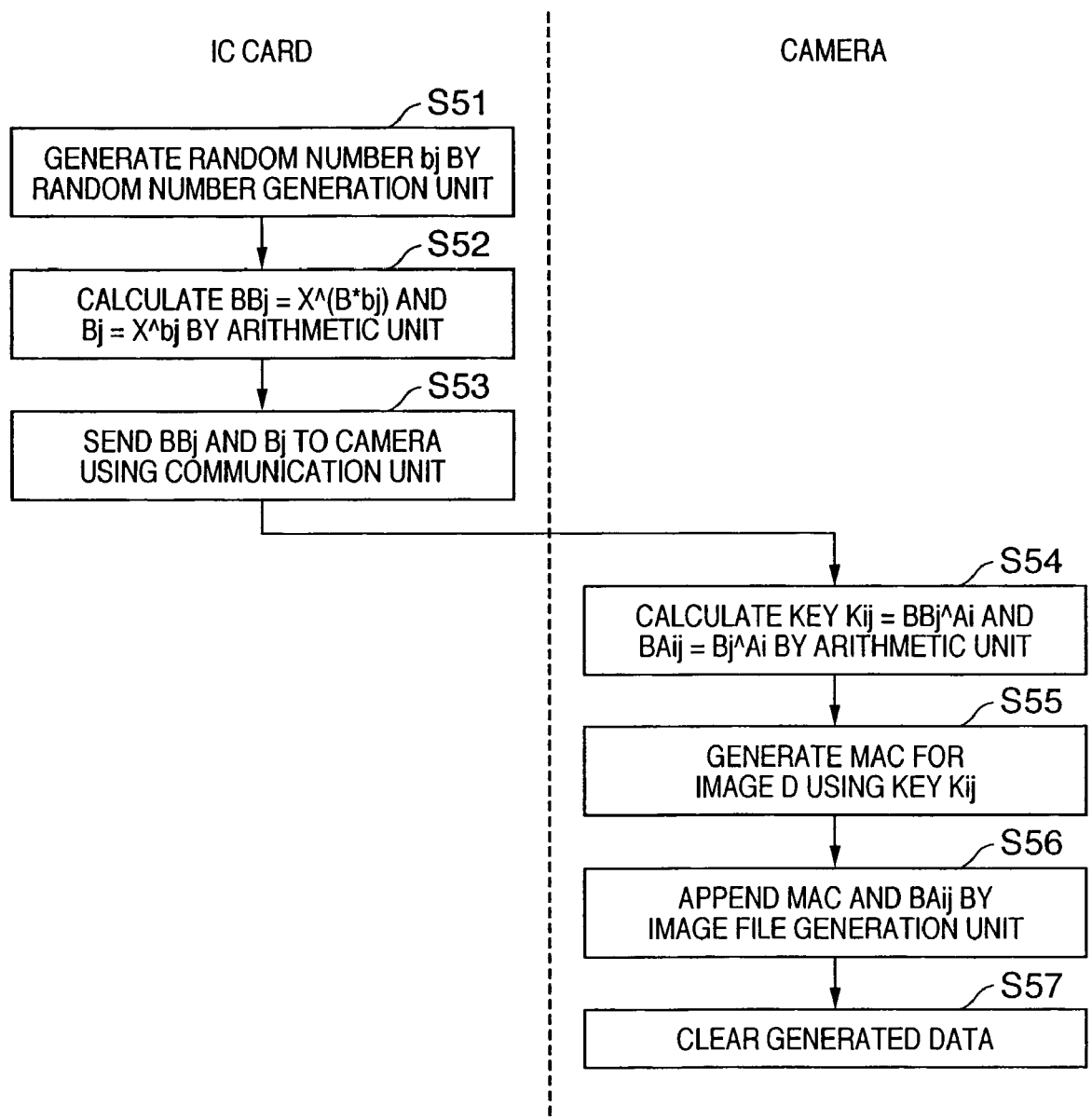
FIG. 5 is a flowchart for explaining MAC generation processing according to the embodiment of the present invention.

Processing for generating the verification data including a MAC data for an image file (to be also simply referred to as an image hereinafter) D, which is generated by the image capturing unit 25 and image file generation unit 26 of the camera 11, in collaboration of the camera 11 and IC card 12 will be described below using FIG. 5. FIG. 5 is a flowchart showing processing for generating the verification data (including a MAC data) for an image D. In the following description, X represents the primitive root of GF(P), and P is a prime number. A notation X^a is an abbreviation for X^a mod P.

The IC card 12 generates a random number bj using the random number generation unit 42 (step S51). The random number bj may be generated each time the verification information of an image file is generated or every given time intervals. Note that the random number generation unit 42 generates a random number by symmetric-key cryptography such as DES, AES, or the like set with an appropriate initial value and key.

Next, BBj=X^(B×bj) and Bj=X^bj are calculated using the arithmetic unit 43 of the IC card 12 (step S52). The generated BBj and Bj are sent to the camera 11 using the communication unit 44 (step S53). Note that the arithmetic unit 43 comprises a CPU, a RAM, and a ROM, a dedicated IC chip, or the like, and executes designated arithmetic operations. The random number bj, BBj and Bj, and values used in the process of calculating them are to be erased from a memory after the processing in step S53.

The aforementioned processing of the IC card 12 is controlled by the control unit 29. Note that it is computationally difficult to calculate B and bj from BBj and Bj. Also, note that BBj is a value obtained by the secret information B and random number bj, and cannot be calculated from only the secret information B commonly held by all the IC cards 12.

The camera 11 controls the arithmetic unit 23 to calculate a key Kij=BBj^Ai=X^(B×bj×Ai) and BAij=Bj^Ai=X^(bj×Ai) from BBj and Bj sent from the IC card 12 via the communication unit 24 (step S54).

The communication unit 24 implements a standard communication protocol with the IC card. Note that the key Kij is a function of B, bj, A, and ai. Therefore, note that the key Kij cannot be calculated from only the secret information A commonly held by all the cameras and the secret information B commonly held by all the IC cards. Also, note that BAij is a function of bj, A, and ai, and the key Kij cannot be calculated from BAij unless arbitrary information associated with the secret information B can be acquired.

The camera 11 then controls the MAC generation unit 28 to generate a MAC for an image D using the key Kij (step S55). At this time, the MAC is obtained by compressing the image D by the hash generation unit 27, and applying a calculation to the compressed value (hash value) using the key Kij by the MAC generation unit 28.

Note that the image D is an image file which is obtained by compressing an image captured by the image capturing unit 25 and outputting it in a format such as JPEG or the like by the image file generation unit 26. Also, the file format of the image file to be generated by the image file generation unit 26 may be any of JFIF (JPEG File Interchange Format), TIFF (Tagged Image File Format), and GIF (Graphics Interchange Format), their expanded formats, or other image file formats.

As a hash function H used in the hash generation unit 27, MD5, SHA1, RIPEMD, and the like are generally known.

As the MAC data generation algorithm in the MAC generation unit 28, a method of using a CBC (Cipher Block Chaining) mode of symmetric-key cryptography such as DES, AES, or the like, and a method of using a keyed hash function called HMAC are known. In case of the CBC mode of DES, a method of encrypting the target data in the CBC mode, and defining first 32 bits of its last block as MAC data may be used.

Next, the camera 11 appends the MAC and BAij to the image D (image file) generated by the image file generation unit 26 (step S56). Hence, the image file includes at least the image D and MAC, and BAij used in verification. Finally, the camera 11 clears the received BBj and Bj, and the generated key Kij from a memory used in temporary storage (step S57).

The processes in steps S54 to S57 in the camera 11 are controlled by the control unit 29 of the camera 11.

MAC verification processing will be described below using FIG. 7. The MAC verification processing is executed by the PC (image verification assistant apparatus) 13 and attack resistant apparatus (IC card) 12 shown in FIG. 1.

The PC 13 loads the image file which includes the image D and the MAC, and BAij used in verification from an image input unit (not shown: including the communication unit 61) (step S70). For example, in the case where the image file is loaded via a network, the image input unit can be implemented as a network interface or the like.

The PC 13 controls the image file separation unit 62 to separate the loaded image file into the image D and a MAC, and BAij used in verification (step S71). Next, the PC 13 controls the hash generation unit 63 to generate a hash value H from the image D (step S72).

The PC 13 sends the generated hash value H, and the separated MAC and BAij used in verification to the IC card 12 using the communication unit 61 (step S73).

Since the image verification assistant apparatus 13 is the PC, the communication unit 61 can be implemented as an I/O with the IC card or the like, and the image file separation unit 62 and hash generation unit 63 can be implemented by the CPU, RAM, ROM, and the like.

The IC card 12 controls the arithmetic unit 43 to calculate a verification key Kij=BAij^B=X^(B×bj×Ai) from the received BAij (step S74). Note that the key Kij becomes equal to Kij generated by the processing of step S54 only when the received BAij is equal to BAij generated by the processing of step S54.

The IC card 12 controls the MAC generation unit 45 to generate MAC2 corresponding to the received hash value H using the key Kij (step S75). The IC card 12 controls the determination unit 46 to compare the generated MAC2 with the received MAC (step S76). If MAC=MAC2, the IC card 12 determines the absence of falsification (step S77); otherwise, it determines the presence of falsification (step S78).

As is known, it is computationally difficult for the MAC generation algorithm to calculate MAC2 that determines the absence of falsification for falsified image data D' without knowing the key Kij. Furthermore, note that Kij=BAij^B cannot be calculated unless information associated with the secret information B is acquired.

The IC card 12 then sends the result to the PC 13 using the communication unit 44 (step S79). Note that the MAC generation algorithm of the MAC generation unit 45 is the same as that of the MAC generation unit 28 of the camera 12, and performs calculations using symmetric-key cryptography such as DES, AES, or the like. The determination unit 46 can be implemented as a CPU and the like.

Finally, the PC 13 displays the received result using the display unit 65 such as a monitor or the like (step S80). More specifically, if the determination unit 46 determines the absence of falsification, a message "not falsified" or the like is displayed; if it determines the presence of falsification, a message "falsified" or the like is displayed.

The processes in steps S70 to S73 and step S80 in the PC 13 are controlled by the control unit 66 of the PC 13. On the other hand, the processes in steps S74 to S79 in the IC card 12 are controlled by the control unit 47 of the IC card 12.

As described above, in this embodiment, since the secret information set for the camera 11 in the production process by the vendor is common to all the cameras 11, the production process is never complicated. Furthermore, when the secret information of the camera 11 is individualized by a user's setting, since verification information is generated using the individualized secret information, other cameras are not damaged even if information of one camera 11 is leaked. Note that the user's setting is realized by a simple operation on the operation unit 22, and the user need only make this operation. Since information commonly set for all the cameras 11 is managed in secret, the user cannot know it and, hence, it is difficult for the user to falsify image data.

In this embodiment, the secret information is individualized by the user's setting, but it need always be individualized. If the individualizing processing is skipped, the production process of the vendor is never complicated, it is difficult for the user to falsify image data, and the number of processes in the camera can be reduced.

Also, since the secret information set for the IC card 12 in the production process by the vendor is common to all the IC cards 12, the production process is never complicated. Also, the predetermined IC card 12 can be used to generate verification information of all the cameras 11 and to verify all pieces of verification information.

In this embodiment, the key individualizing processing and MAC generation processing have been separately described for the sake of convenience. However, a key may be generated while executing the key individualizing processing in step S54.

Second Embodiment

The first embodiment has explained the arrangement of the camera 11 which performs the modular exponentiation arithmetic operation (step S54). However, the modular exponentiation arithmetic operation requires high arithmetic performance. Hence, this embodiment will explain an arrangement that allows the camera 11 to generate verification data (including MAC) even when the IC card 12 has a high arithmetic capacity associated with security but the arithmetic capacity of the camera 11 is not so high. Note that the image generation apparatus 11, the attack resistant apparatus 12, and the image verification assistant apparatus 13 of this embodiment have the same arrangements as those described in the first embodiment, and a description thereof will be omitted.

Figure 10:
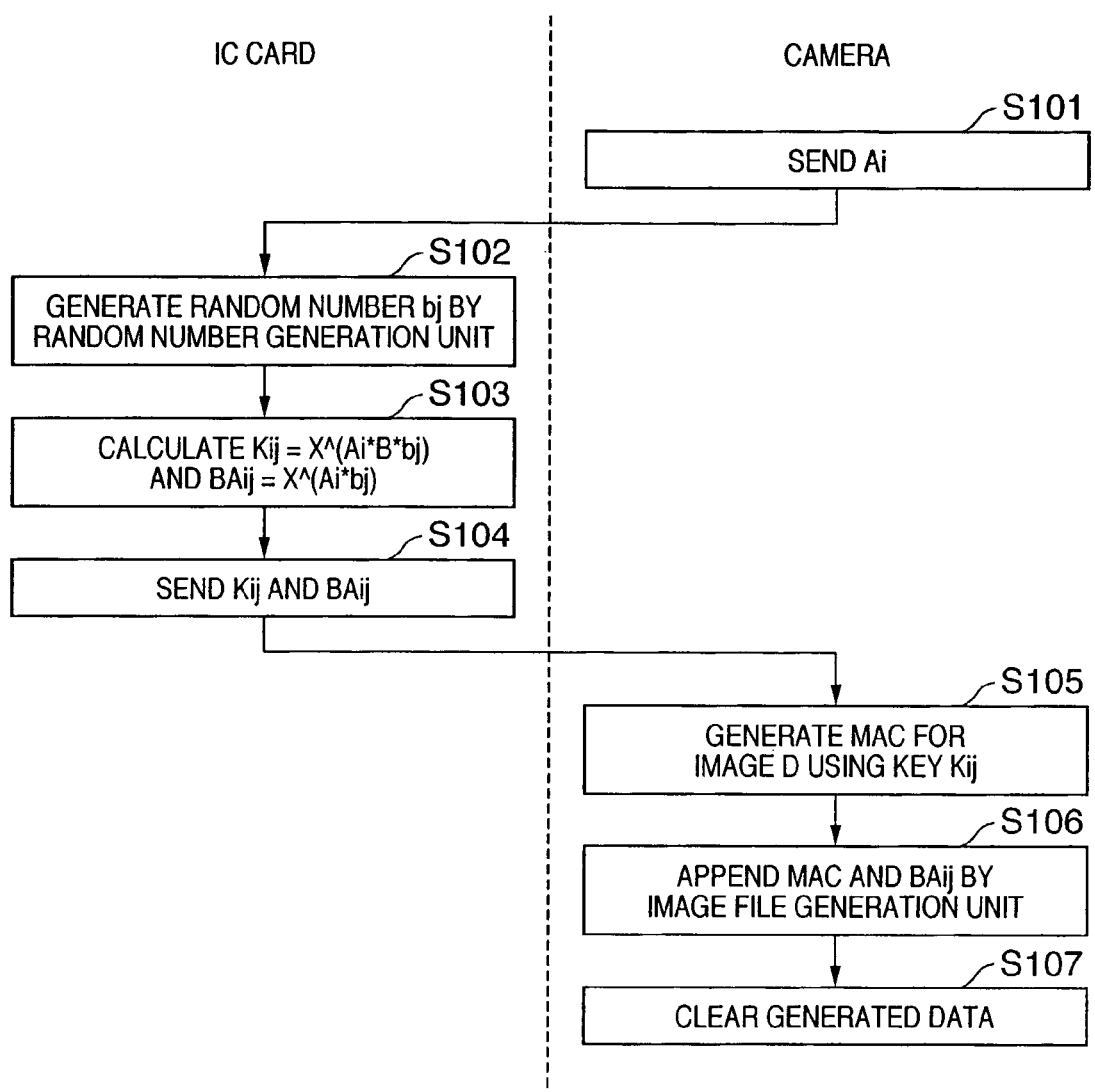
FIG. 10 is a flowchart for explaining MAC generation processing according to the second embodiment.

In this case, the MAC generation processing shown in FIG. 5 can be modified, as shown in FIG. 10 (assume that the key individualizing processing and the like have been done in the same manner as the first embodiment).

The camera 11 transmits secret information Ai to the IC card 12 (step S101).

The IC card 12 then controls the random number generation unit 42 to generate a random number bj (step S102). The IC card 12 controls the arithmetic unit 43 to calculate a key Kij=X^(Ai×B×bj) and BAij=X^(bj×Ai) (step S103). The IC card 12 sends the generated Kij and BAij to the camera 11 using the communication unit 44 (step S104). After Kij and BAij are outputted, the IC card 12 clears Ai, bj, Kij, and BAij, and values used in the process of calculating them from a memory.

The camera 11 controls the MAC generation unit 28 to generate a MAC for an image D using the key Kij received from the IC card 12 (step S105). At this time, the MAC is calculated by compressing the image D by the hash generation unit 27, applying a calculation to the compressed value (hash value) using the key Kij, and so forth, as in the first embodiment.

The camera 11 appends the MAC and BAij to the image file of the image D by the image file generation unit 26 (step S106). Finally, the camera 11 clears the received BAij and the generated key Kij (step S107).

As in the first embodiment, the processes in step S101 and steps S105 to S107 are controlled by the control unit 29 of the camera 11, and the processes in steps S102 to S104 are controlled by the control unit 47 of the IC card 12.

In this way, the same processing as in the first embodiment can be done without imposing any load on the camera 11 (without making any modular exponentiation arithmetic operation in this embodiment).

Third Embodiment

The third embodiment will be described below. In the first and second embodiments, a case has been explained wherein the MAC data generation processing is applied to only image data of an object. However, MAC data can be generated by the same scheme as image data for information corresponding to meta data of image data such as auxiliary parameters (for example, an image capturing time, the focal length, the aperture value, the ISO speed, the photometry mode, the image file size, the photographer information, etc.), and the MAC verification processing can be similarly implemented for such auxiliary parameters. Note that the image generation apparatus 11, the attack resistant apparatus 12, and the image verification assistant apparatus 13 of this embodiment have the same arrangements as those described in the first embodiment, and a description thereof will be omitted.

Since both image data and meta data are binary data, this processing can be implemented by substituting image data by meta data, i.e., switching input to the hash generation unit 27 from image data to meta data. This data switching is realized by the control unit 29.

Figure 7:
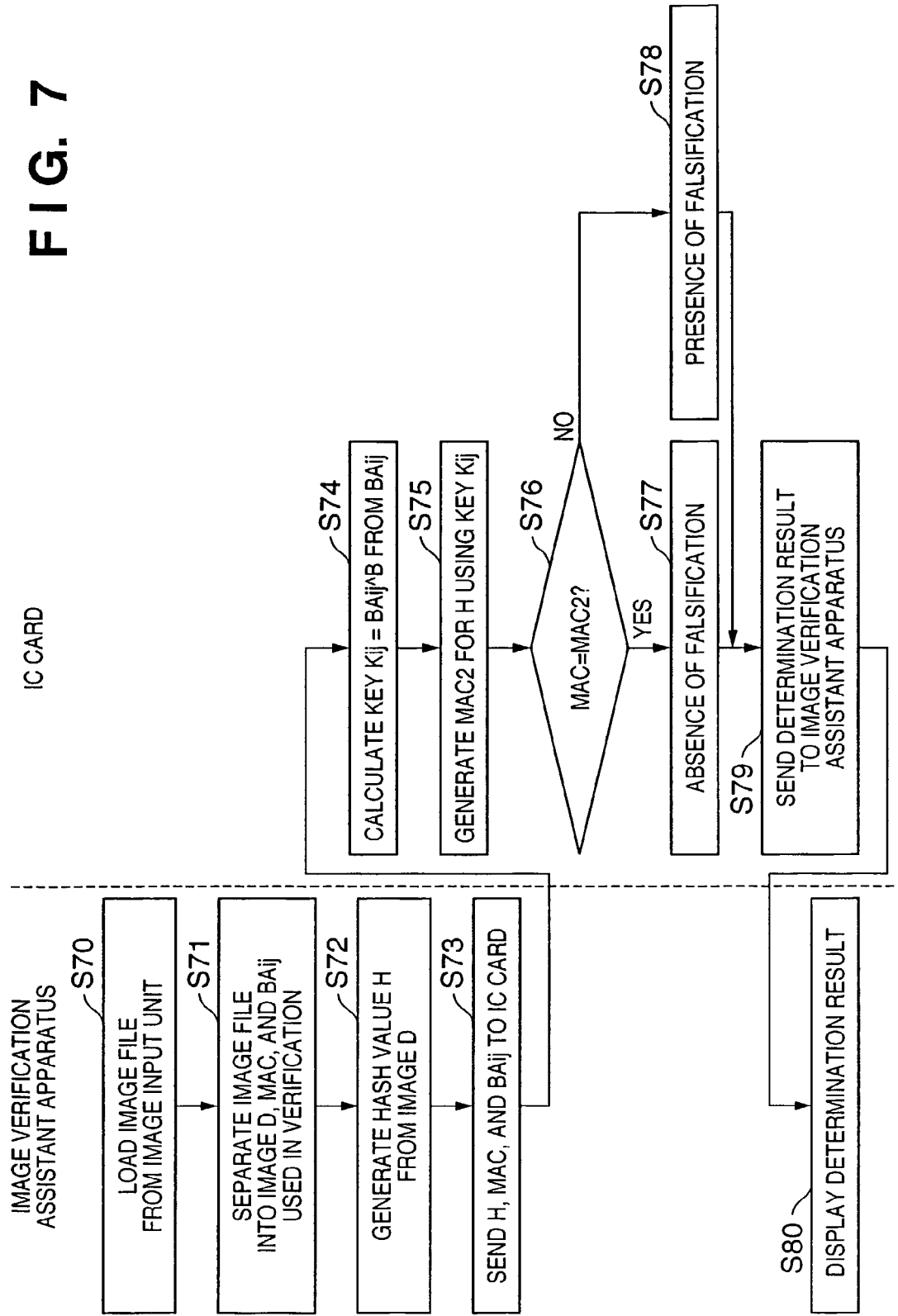
FIG. 7 is a flowchart for explaining MAC verification processing according to the first embodiment.
Figure 8:
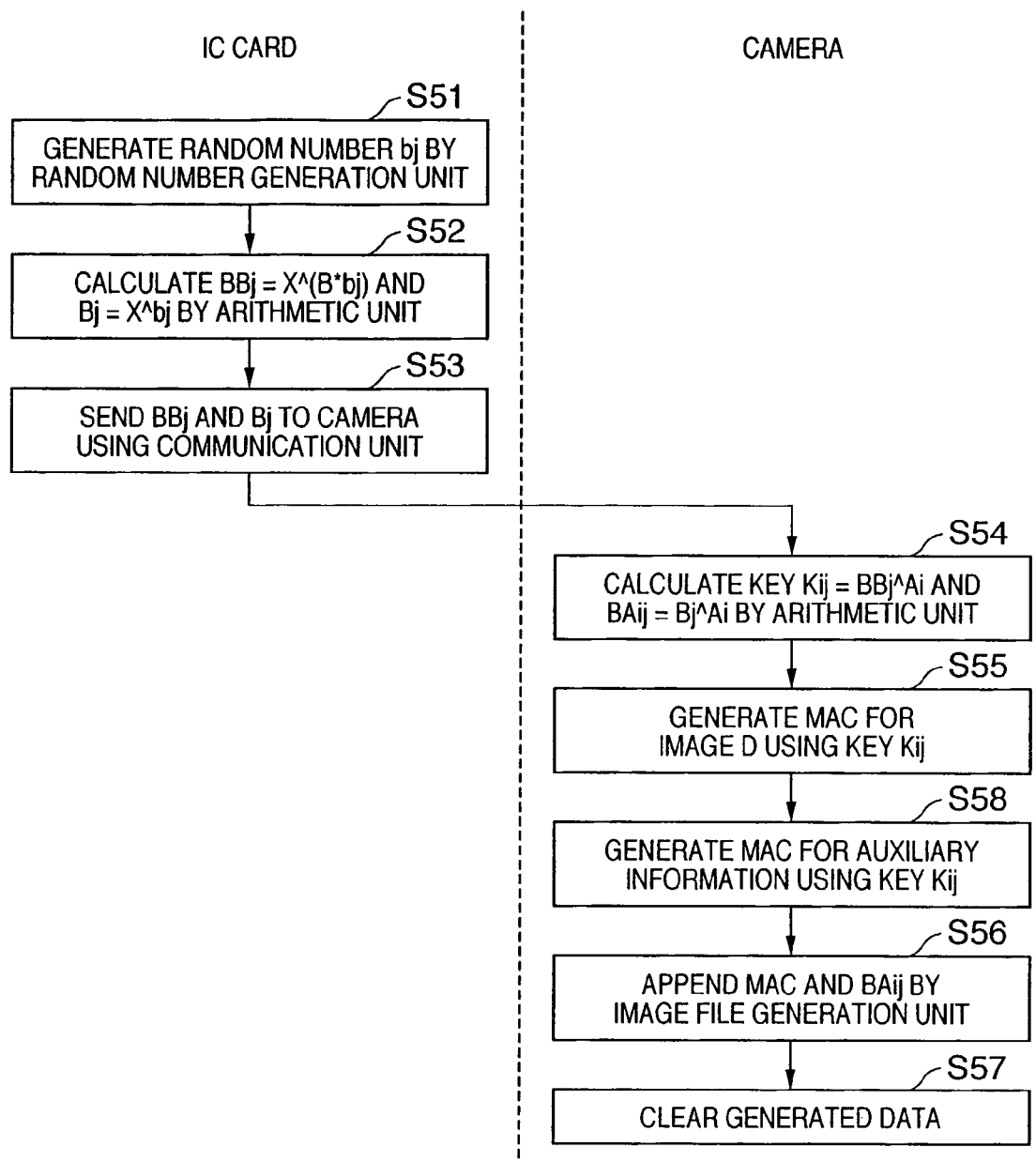
FIG. 8 is a flowchart for explaining MAC generation processing according to the third embodiment.
Figure 9:
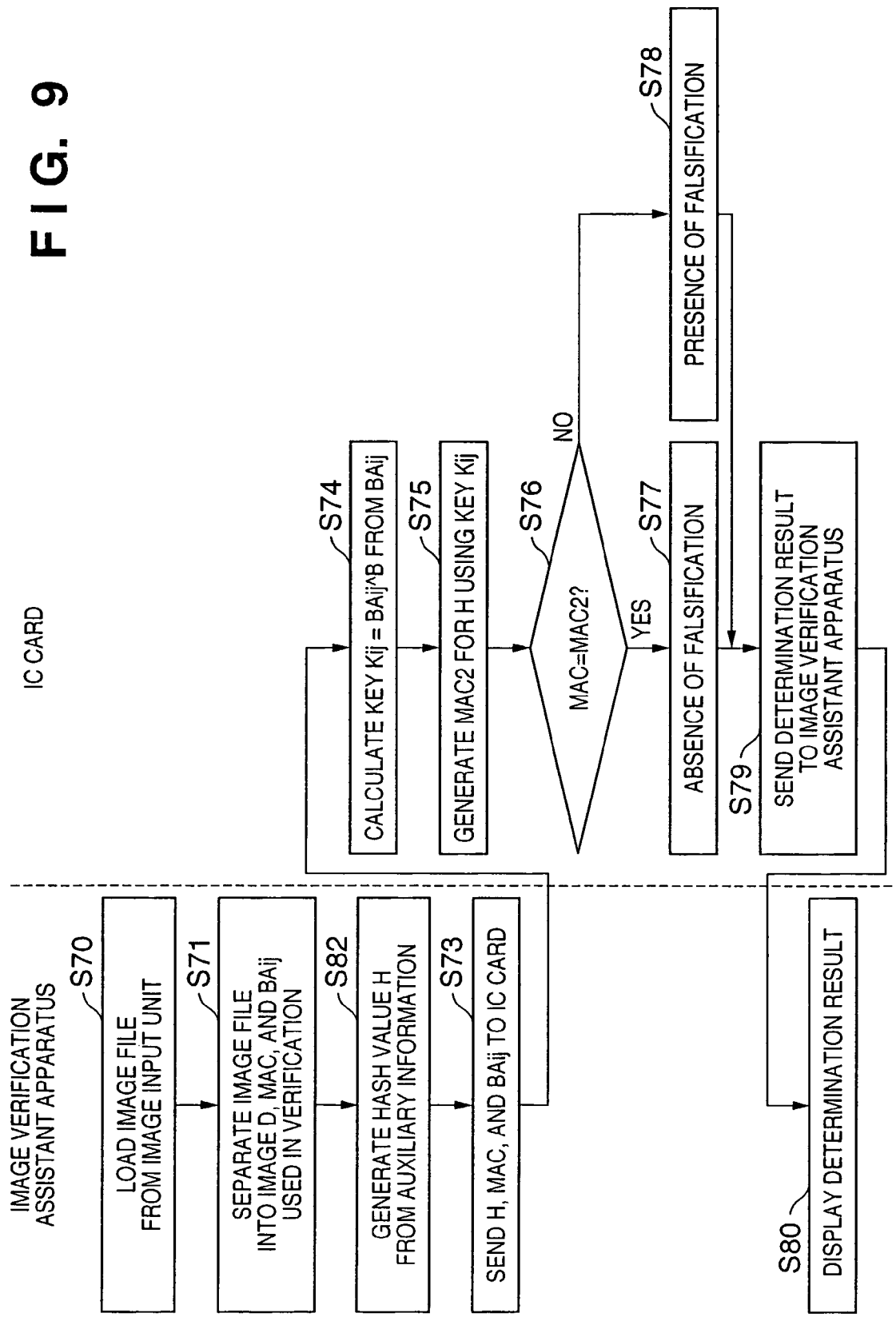
FIG. 9 is a flowchart for explaining MAC verification processing according to the third embodiment.

FIGS. 8 and 9 show the sequences of this embodiment. FIG. 8 is a flowchart obtained by adding the MAC generation processing of auxiliary parameters to the flowchart of FIG. 5 as step S58, and FIG. 9 is a flowchart obtained by replacing the process in step S72 in the flowchart of FIG. 7 by hash value generation of auxiliary parameters in step S82. Falsification of image data can be detected using the sequence in FIG. 7. In FIG. 8, MAC data of image data and auxiliary parameters are separately generated in steps S55 and S58. However, MAC data may be generated for a file including image data and auxiliary parameters, and the image verification assistant apparatus may simultaneously detect if they are falsified.

By implementing the above arrangement, falsification of not only image data but also meta data associated with an image can be detected.

Fourth Embodiment

The embodiments according to the present invention have been described. However, the present invention is not limited to the above arrangement.

For example, in the first embodiment, the MAC verification processing has been explained while its processes are separated into the image verification assistant apparatus 13 (PC)

and the attack resistant apparatus 12 (IC card) in FIG. 1. However, an arrangement using an apparatus which integrates the image verification assistant apparatus 13 and the attack resistant apparatus 12 may be adopted. In this case, only an image file can be input from the image generation apparatus 11 to the image verification assistant apparatus 13, the processing in FIG. 7 can be done within the single apparatus, and the image verification assistant apparatus 13 and the attack resistant apparatus 12 need not be distinguished.

Also, the key individualizing processing is calculated by Ai=A×ai for the sake of simplicity, but it may be calculated as a function of Ai=f(A, ai). More specifically, this calculation is not particularly limited as long as a predetermined arithmetic operation is made to have A and ai as inputs (for example, Ai=A+ai may be used).

In this case, Ai is the result of the arithmetic operation using A and ai. Since A is common secret information determined by the vendor and ai is information that only the user knows, it is noted that a third party (including the vendor) cannot know the value Ai, and the user himself or herself cannot know the value Ai, either.

In each of the above embodiments, the secret information A is information common to all cameras provided by the vendor, and the secret information B is information common to all IC cards provided by the vendor. However, these kinds of information may be changed as needed. For example, different kinds of information may be used for respective models.

In the description of the first to third embodiments, image data is used as information to be verified. However, the present invention is not limited to such specific data. More specifically, the present invention can be applied to predetermined digital data such as audio data and moving image data, a document file, and the like.

In the description of the first to third embodiments, the digital camera is used as the apparatus for generating information to be verified. However, the present invention is not limited to such specific apparatus. For example, the present invention can be applied to a predetermined information processing apparatus such as a voice recorder, a digital video camera, a portable phone, a PC, and the like.

Fifth Embodiment

An arrangement which further improves the security using a digital signature technique will be described below. This digital signature technique will be described first.

The digital signature technique is a validation technique in which a sender sends data (data to be verified) and digital signature data corresponding to the data of interest together, and a receiver verifies the data of interest using the digital signature data, so as to confirm the validity of the data of interest.

It is a common practice for the digital signature technique to confirm the validity of data using a hash function and public-key cryptography. Let Ks be a secret key of the public-key cryptography, and Kp be its public key. Then, the digital signature technique will be described below.

A sender performs an arithmetic operation $H(M)=h$ for calculating an output h with a predetermined length by compressing plaintext data (data to be verified) M by a hash function HQ. The sender then performs an arithmetic operation for generating digital signature data s by converting h using the secret key Ks, i.e., $D(Ks, h)=s$. After that, the sender transmits the digital signature data s and plaintext data M to a verifier.

On the other hand, the verifier performs an arithmetic operation for converting the received digital signature data s by the public key Kp, i.e., $E(Kp, s)=E(Kp, D(Ks, h''))=h''$, and an arithmetic operation $H(M')=h'$ by calculating h' by compressing received plaintext data M' by the same hash function as the sender. If $h'=h''$, the verifier determines that the received data M' is valid (M'=M).

When the plaintext data M has been falsified between the sender and receiver, since $E(Kp, s)=E(Kp, D(Ks, h''))=h''$ does not match h' obtained by compressing the received plaintext data M' by the same hash function as the sender, the presence of falsification can be detected. If the digital signature data s has been falsified in correspondence with that of the plaintext data M, falsification cannot be detected. However, such a falsification operation must calculate the plaintext data M from h, and such a calculation is computationally hard to perform due to the one-way property of hash function.

The hash function will be described below. The hash function is used to speed up generation of the digital signature data. The hash function has a function of processing plaintext data M having an arbitrary length and outputting an output h with a predetermined length. In this case, the output h is called a hash value (or message digest or digital fingerprint) of the plaintext data M. The hash function is required to have a one-way property and collision resistance. The one-way property means that it is computationally hard to calculate plaintext data M that satisfies $h=H(M)$ when h is given. The collision resistance means that it is computationally hard to calculate plaintext data M' ($M \neq M'$) that satisfies $H(M)=H(M')$ when plaintext data M is given, and it is computationally hard to calculate plaintext data M and M' that satisfy $H(M)=H(M')$ and $M \neq M'$.

As the hash function, MD-2, MD-4, MD-5, SHA-1, RIPEMD-128, RIPEMD-160, and the like are known, and these algorithms are open to the public.

Next, the public-key cryptography will be explained. The public-key cryptography is a cryptography in which an encrypt key (public key) is different from a decrypt key (secret key), the encrypt key is open to the public, and the decrypt key is held in secret. Characteristic features of the public-key cryptography are as follows:

(a) Since the encrypt and decrypt keys are different and the encrypt key can be open to the public, the encrypt key need not be delivered in secret, and key delivery is easy.

(b) Since the encrypt key of each user is open to the public, the user can store and manage only the self decrypt key in secret.

(c) A validation function that allows the receiver to confirm that the sender of the received message is not a pretender, and that message is not falsified can be implemented.

For example, let $E(Kp, M)$ be an encryption operation for plaintext data M using the public key Kp and $D(Ks, M)$ be a decryption operation using the secret key Ks. Then, the public-key cryptography algorithm meets the following two conditions first.

(1) If Kp is given, it is easy to calculate $E(Kp, M)$. If Ks is given, it is easy to calculate $D(Ks, M)$.

(2) If Ks is unknown, even if the calculation sequence of Kp and E( ) and C ($=E(Kp, M)$) are known, it is computationally difficult to determine M.

When the following condition (3) is established in addition to (1) and (2) above, a secret communication can be implemented.

(3) For all plaintext data M, $E(Kp, M)$ can be defined and $D(Ks, E(Kp, M))=M$ holds. That is, since Kp is open to the public, everyone can calculate E(Kp, M) but only an original having the secret key Ks can obtain M by calculating D(Ks, E(Kp, M)).

When the following condition (4) is established in addition to (1) and (2) above, a validation communication can be implemented.

(4) For all plaintext data M, D(Ks, M) can be defined and E(Kp, D(Ks, M)) holds. That is, only an original having the secret key Ks can calculate D(Ks, M), and even when another person calculates D(Ks', M) using a false secret key Ks' and impersonates an original having Ks, since E(Kp, D(Ks', M))≠M, the receiver can confirm that the received information is illicit. Even when D(Ks, M) is falsified, since E(Kp, D(Ks, M)')≠M, the receiver can confirm that the received information is illicit.

Furthermore, since only a person who has the secret key Ks can generate D(Ks, M) when the validity of plaintext data M is confirmed, it is concluded that the person who appended a signature to the plaintext data M is that person.

The RSA cryptography, R cryptography, and the like are known as typical example which can make the secret communication and validation communication.

Note that encryption and decryption of the RSA cryptography which is most popularly used at present, and signature generation and signature verification processing can be implemented by:

Encryption: encrypt key (e, n) encryption conversion C=M^(mod n)

Decryption: decrypt key (d, n) decryption conversion M=C^d(mod n)

Signature generation: signature key (d, n) signature generation S=M^d(mod n)

Signature verification: signature verification key (e, n) signature
verification M=S^e(mod n)

Note that n=p·q, and p and q are large different prime numbers. Also, e and d are integers which meet:

$$e \cdot d = 1 (\mathrm{mod}\ L)$$

$$L = \mathrm{LCM}((p-1),(q-1))$$

where LCM(a, b) indicates the least common multiple of a and b.

Figure 11:
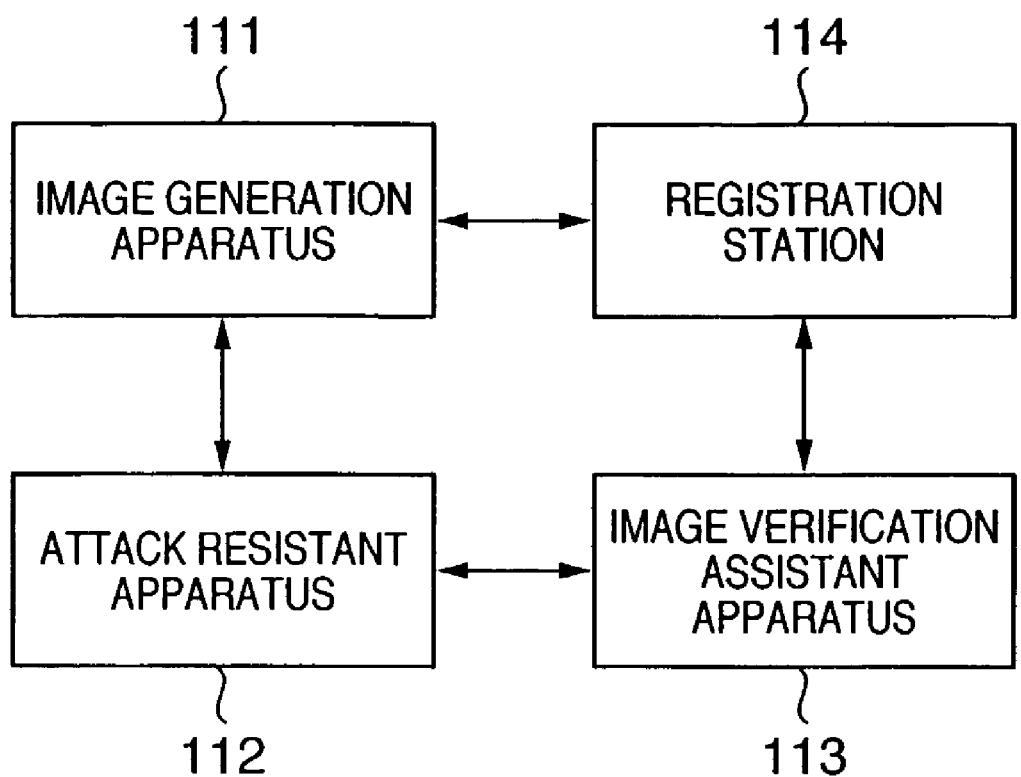
FIG. 11 is a block diagram for explaining an example of the arrangement of an image verification system according to another embodiment of the present invention.

The arrangement of this embodiment will be described below. FIG. 11 is a block diagram of a system of this embodiment. As shown in FIG. 11, this system comprises an image generation apparatus 111 which generates image data to be validated, and also its verification data, an image verification assistant apparatus 113, an attack resistant apparatus 112 which can communicate with these apparatuses, and a registration station 114.

The image generation apparatus 111 has a function of holding a secret key and generating a digital signature, a function of verifying the digital signature, a function of setting a key for MAC generation, a function of generating/capturing image data, a function of generating MAC data for the generated image data, a function of generating auxiliary parameters (for example, in case of a camera, an image capturing time, the focal length, the aperture value, the ISO speed, the photometry mode, the image file size, the photographer information, etc.), a function of generating an image file with MAC data (including image data, MAC data, auxiliary parameters, and the like), and a function of communicating with the attack resistant apparatus 112. Note that the image generation apparatus 111 may be either an image capturing apparatus such as a digital camera, digital video camera, scanner, or the like, or an electronic apparatus with a camera unit. For the sake of simplicity, the image generation apparatus 111 will be described as a camera (digital camera) hereinafter.

The attack resistant apparatus 112 has a function of storing information required to generate/verify verification data, a function of calculating information required for verification, and a function of communicating data with the image generation apparatus 111 and the image verification assistant apparatus 113. Note that the attack resistant apparatus 112 is a memory card or IC card with a security function, which has an arithmetic unit including a CPU, a RAM, and a ROM in addition to a flash EEPROM. For the sake of simplicity, the attack resistant apparatus 112 will be described as an IC card hereinafter.

The image verification assistant apparatus 113 has a function of verifying a digital signature, a function of separating an image file with MAC data, a function of calculating a hash value of the separated image data, a function of communicating with the attack resistant apparatus 112, and a function of displaying a determination result. Note that the image verification assistant apparatus 113 may be either a PC which can store and distribute data like a Web server or a compact apparatus having a CPU, memory, and the like. For the sake of simplicity, the image verification assistant apparatus 113 will be described as a PC hereinafter.

The registration station 114 has a function of verifying the user, a function of generating a pair of a secret key and public key unique to the user in accordance with an application from a valid user, a function of sending the pair of keys to the valid user together with a public key certificate, and a function of notifying or disclosing a public key of each user and that of the registration station. Assume that the registration station 114 is a PC that can perform communications via a network.

Figure 12:
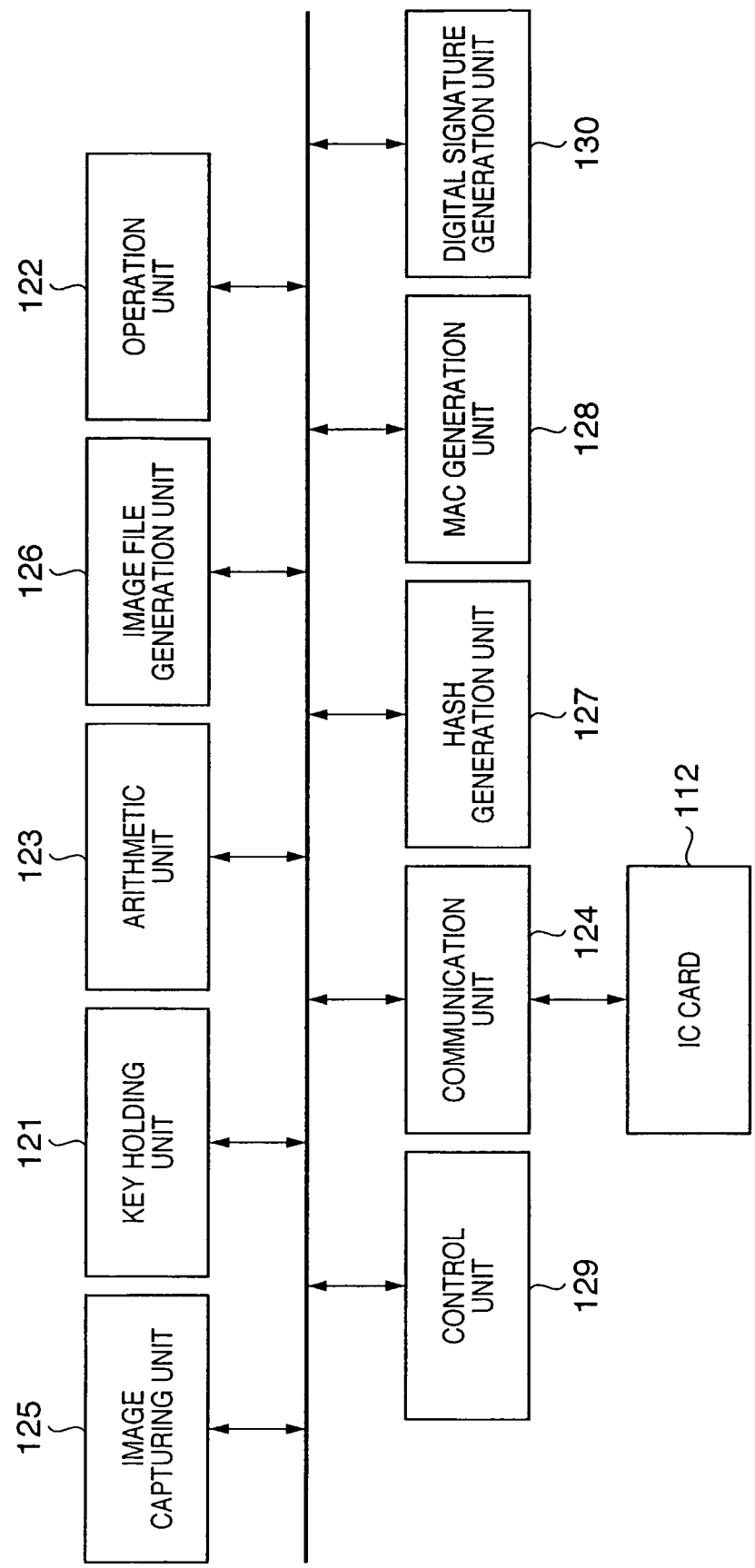
FIG. 12 is a block diagram showing the principal functional arrangement of an image generation apparatus 111 according to the embodiment of the present invention.

FIG. 12 is a block diagram of the camera 111 of this embodiment. Referring to FIG. 12, reference numeral 122 denotes an operation unit which is a user interface unit including switches, a panel, and the like used to set various parameters in the camera, to issue an image capturing instruction of an object, and the like. Reference numeral 125 denotes an image capturing unit which has an optical sensor such as a CCD (charge coupled device) or the like, and generates image data of an object and auxiliary parameters in accordance with an instruction input to the operation unit 122. Reference numeral 121 denotes a key holding unit which comprises a writable non-volatile memory. Reference numeral 123 denotes an arithmetic unit (which comprises a CPU, RAM, and ROM, a dedicated IC chip, or the like), which performs predetermined arithmetic operations in accordance with a request from a control unit 129. Reference numeral 126 denotes an image file generation unit which generates an image file of a predetermined format from the captured image, and writes it in a detachable memory card (not shown). Reference numeral 129 denotes a control unit for controlling the overall apparatus; reference numeral 127 denotes a hash generation unit for calculating a hash value; and reference numeral 128 denotes a MAC generation unit. Reference numeral 124 denotes a communication unit for communicating with the IC card (attack resistant apparatus) 112. Reference numeral 130 denotes a digital signature generation unit which comprises a CPU for executing signature generation processing using the aforementioned RSA cryptography or the like, and memories such as a RAM, a ROM, and the like used to store key information required for such processing.

Figure 13:
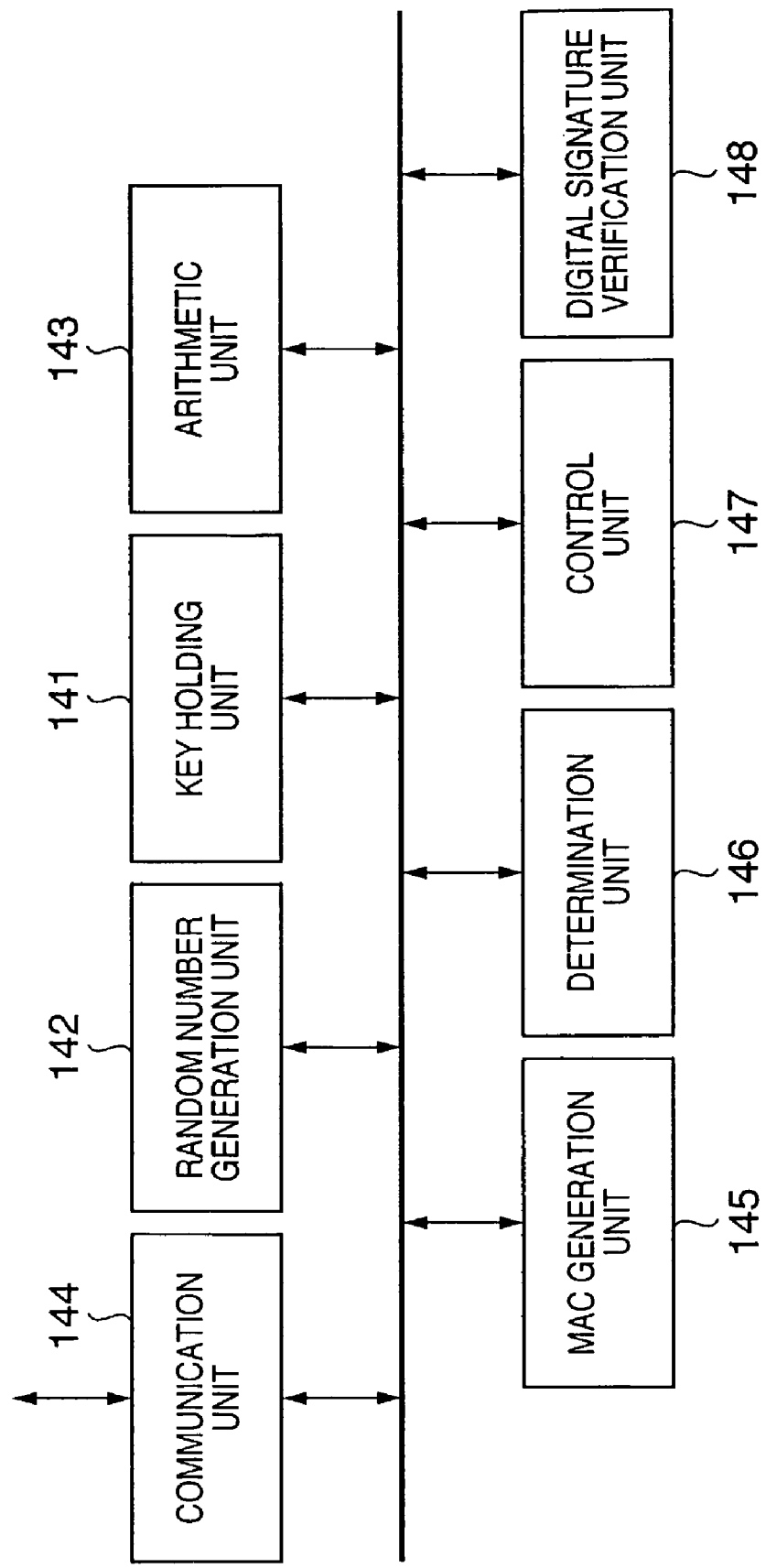
FIG. 13 is a block diagram for explaining the principal functional arrangement of an attack resistant apparatus 112 according to the embodiment of the present invention.

FIG. 13 is a block diagram of the IC card 112 according to this embodiment. Referring to FIG. 13, reference numeral 141 denotes a key holding unit which comprises a writable non-volatile memory; and reference numeral 143 denotes an arithmetic unit which performs predetermined arithmetic operations in accordance with a request from a control unit 147. Reference numeral 142 denotes a random number generation unit which generates a random number by a predetermined algorithm in accordance with a request from the control unit 147; and reference numeral 145 denotes a MAC generation unit which generates a MAC. Reference numeral 147 denotes a control unit which controls the overall apparatus; reference numeral 146 denotes a determination unit which determines the validity of image data; reference numeral 144 denotes a communication unit which communicates with other apparatuses; and reference numeral 148 denotes a digital signature verification unit which verifies a digital signature.

The functional arrangement of the PC (image verification assistant apparatus) 113 in this embodiment is represented by the functional block diagram of FIG. 6 as in the first embodiment, and a description thereof will be omitted. Note that the IC card 12 in FIG. 6 is read as the IC card 112.

Figure 19:
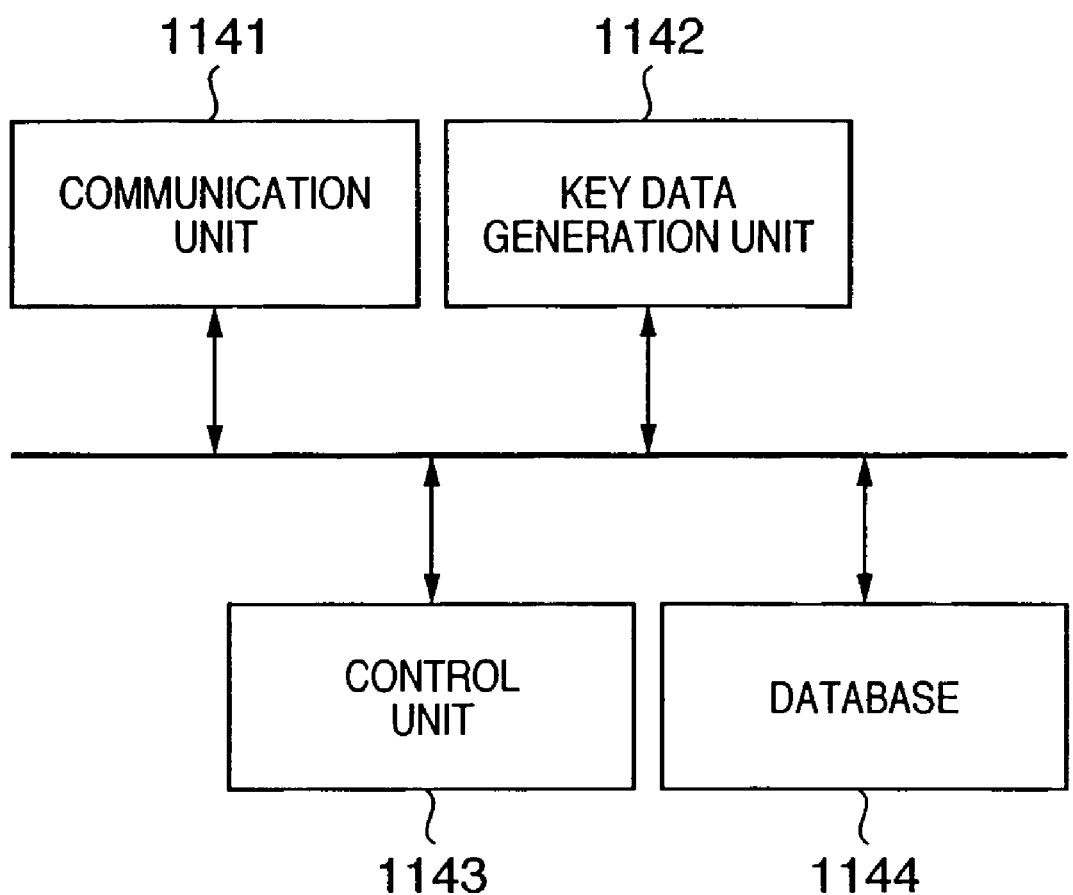
FIG. 19 is a block diagram for explaining the principal functional arrangement of a registration station 114 according to the embodiment of the present invention.

FIG. 19 is a functional block diagram of the registration station 114 in this embodiment. Referring to FIG. 19, reference numeral 1141 denotes a communication unit which is used to communicate with other apparatuses. Reference numeral 1142 denotes a key data generation unit which generates key information and public key certificate (to be described later). Reference numeral 1143 denotes a database which stores data of a correspondence table between the ID and password of the camera (image generation apparatus) 111, user's public key information, and the like. Reference numeral 1144 denotes a control unit which controls the overall apparatus.

In the above arrangement, assume that the camera 111 has predetermined secret information A in the key holding unit 121 in the production process. This secret information A is common to all cameras provided by the vendor. Note that the secret information A, and ai and Ai to be described later represent numerical values, and are set as numerical values having a predetermined bit length. Note that the key holding unit 121 adopts an arrangement that inhibits data from reading out to external units except for the arithmetic unit 123, so as to prevent key information leakage.

Likewise, assume that the IC card 112 has predetermined secret information B in the production process, and the secret information A set in the camera in the key holding unit 141. This secret information B is common to all IC cards provided by the vendor. Note that the secret information B represents a numerical value, and is set as a numerical value having a predetermined bit length. Furthermore, the IC card 112 has a public key of the registration station 114 used to verify the validity of the public key certificate in the key holding unit 141. When the public key of the registration station 114 is updated, the key holding unit 141 is updated using an appropriate known method. Note that the key holding unit 141 adopts an arrangement that inhibits data from reading out to external units except for the arithmetic unit 143, so as to prevent key information leakage.

Figure 17:
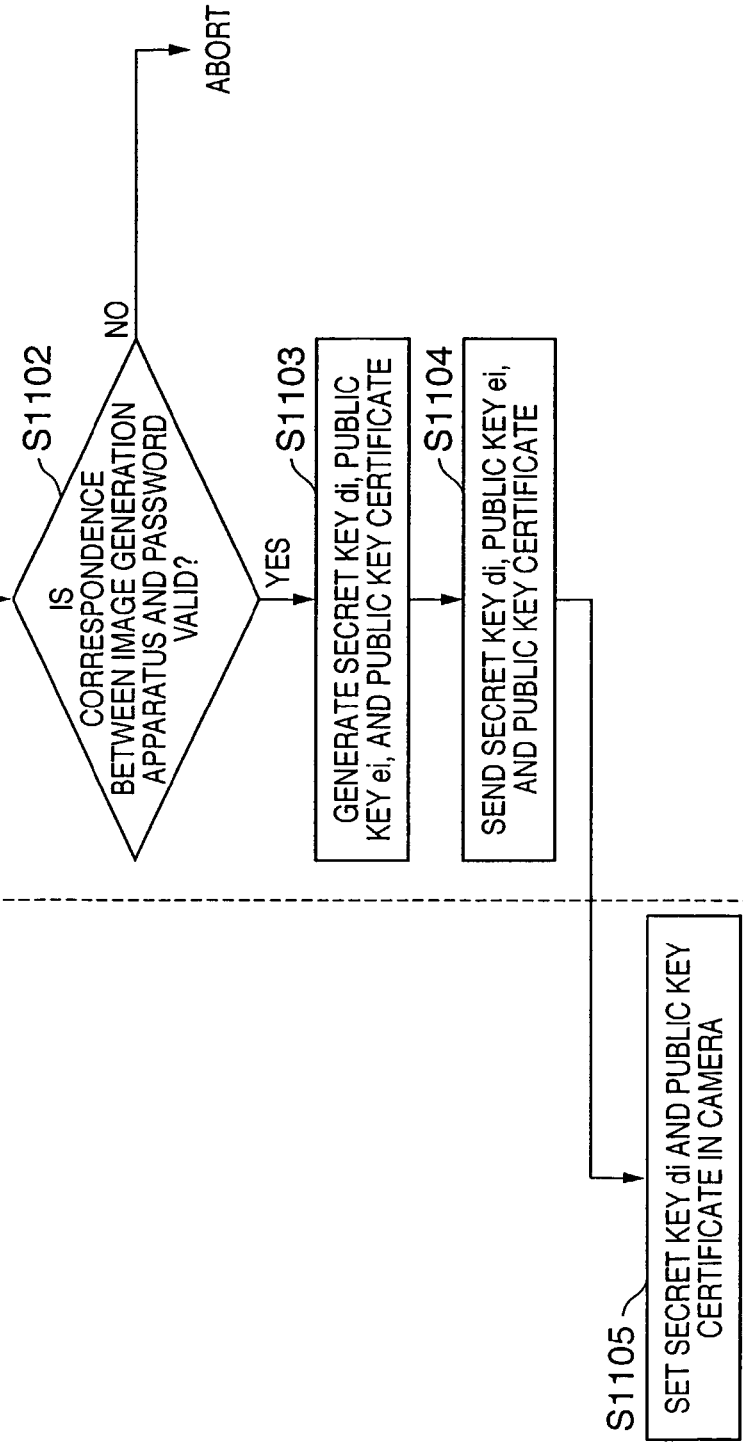
FIG. 17 is a flowchart for explaining secret key distribution processing for digital signature according to the embodiment of the present invention.

The secret key distribution processing for a digital signature to each user will be described below using FIG. 17. FIG. 17 is a flowchart showing the secret key distribution processing. Note that the camera (image generation apparatus) 111 is appended in advance with secure communication means with the registration station 114. For example, encryption communication software as bundle software of the camera 111 and a password unique to each camera 111 are appended, for the sake of simplicity.

The user installs the bundle software in his or her PC to assure a secure communication path with the registration station 114, and presents a password corresponding to the ID of the camera (image generation apparatus) 111 to the registration station 114 (step S1101). The registration station stores the correspondence table of the ID and password of each camera (image generation apparatus) 111 in its database 1143, and confirms its validity (S1102). If validity is not confirmed, the registration station aborts processing; otherwise, it controls the key data generation unit 1142 to generate a secret key di, public key ei, and public key certificate for a user i (S1103). Note that the public key certificate is a certificate of validity for a public key, and includes the value of the public key ei, and a signature value of the registration station 114 (generated using the secret key of the registration station 114) for the public key ei.

After that, the registration station sends the secret key di and public key certificate (including the public key ei) to the user via the secure communication path (S1104). Even for identical cameras 111 of the identical vendor, different information values are provided. For this purpose, such information may be generated on the basis of a random number, or the user name, address, password when the user applies to the registration station 114, or the like. The aforementioned processing can be done using a general PC on the basis of the known technique.

Upon acquisition (reception) of various kinds of information from the registration station 114, the bundle software installed in the user's PC displays the received information on the PC. The display format is expressed by hex, and a message that prompts the user to set the received information in the camera 111 is displayed.

The user sets the received secret key di and public key certificate (including the public key ei) in the digital signature generation unit 130 by operating the operation unit 122 (see FIG. 12) of the camera 111 (S1105). Alternatively, the user may directly transfer these pieces of information from the PC to the camera 111 via an interface such as USB or the like.

Since the key individualizing processing for individualizing the camera by the secret information ai unique to each user or camera is done based on the flowchart of FIG. 3 in the same manner as in the first embodiment, a description thereof will be omitted. In this embodiment, the key individualizing processing includes an input operation of arbitrary unique data ai by the user to the camera via the operation unit 122, and the arithmetic operation of the arithmetic unit 123.

Figure 14:
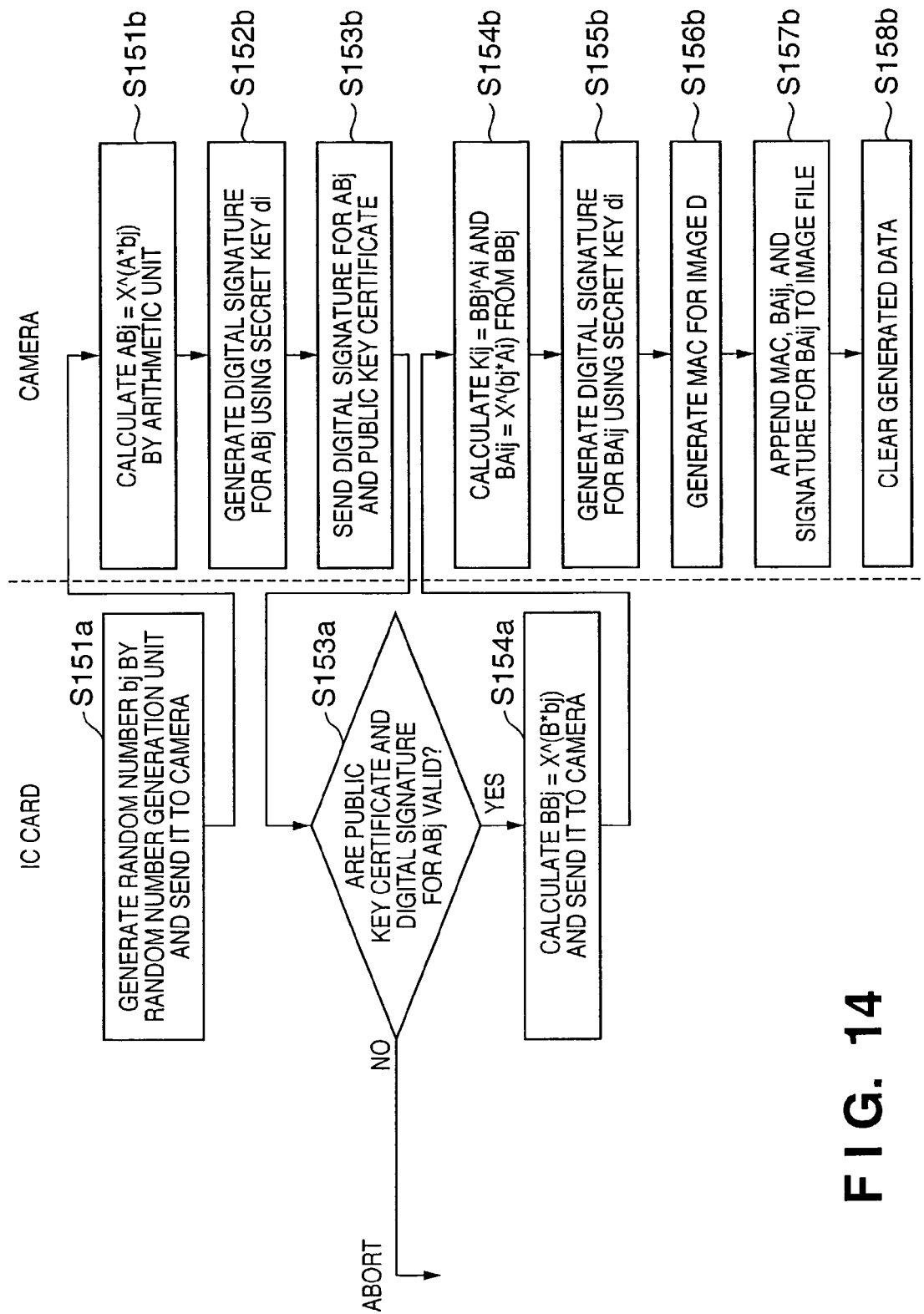
FIG. 14 is a flowchart for explaining MAC generation processing according to the fifth embodiment.

Processing for generating verification data including MAC data for an image file (to be also simply referred to as an image hereinafter) D, which is generated by the image capturing unit 125 and the image file generation unit 126 of the camera 111, in collaboration of the camera 111 and the IC card 112 will be described below using FIG. 14. FIG. 14 is a flowchart showing processing for generating the verification data (including MAC data) for an image D. In the following description, X represents the primitive root of GF(P), and P is a prime number. A notation X^a is an abbreviation for X^a mod P.

The IC card 112 generates a random number bj using the random number generation unit 142 and sends it to the camera 111 using the communication unit 144 (step S151a). The random number bj may be generated each time verification information of an image file is generated or every given time intervals. Note that the random number generation unit 142 generates a random number by symmetric-key cryptography such as DES, AES, or the like set with an appropriate initial value and key. Also, the communication unit 144 implements a standard communication protocol with the camera 111.

Next, the camera 111 calculates ABj=X^(A×bj) using the arithmetic unit 123 (step S151b). The camera 111 controls the digital signature generation unit 130 to generate a digital signature for the calculated ABj using the secret key di (step S152b). The camera 111 then sends the digital signature for the calculated ABj, and the public key certificate (including the public key ei) set in the digital signature generation unit 130 to the IC card 112 using the communication unit 124 with the IC card 112 (step S153b).

The IC card 112 verifies the validity of the received public key certificate and digital signature for ABj using the digital signature verification unit 148 (step S153a). The IC card 112 checks in step S153a whether the public key ei is valid or not, by verifying the signature of the registration station 114 for the public key ei, which is included in the public key certificate. In this case, the public key of the registration station 114 recorded in the key holding unit 141 is used. If it is determined that the public key ei is valid, the IC card 112 also checks whether a value, obtained by calculating $ABj=X^{\wedge}(A \times bj)$ using the arithmetic unit 143 or its hash value, matches a value obtained by decrypting the digital signature sent from the camera 111 using the public key ei. If the two values match, it is determined that the digital signature is valid (YES in step S153a); otherwise, it is determined that the digital signature is invalid (NO in step S153a).

Note that the valid public key certificate with the signature of the registration station 114 is issued to only the valid user, as described above. Also, note that the secret information A must be known to calculate $ABj=X^{\wedge}(A \times bj)$, and the secret information A is managed by the camera 111 or IC card 112 in secret, which is duly produced by the vendor. That is, ABj can only be calculated by the camera 111 which is duly produced.

Note that the digital signature verification unit 148 comprises a CPU for executing the aforementioned RSA verification processing, and memories such as a RAM, a ROM, and the like used to store key information and the like required for that processing. The arithmetic unit 143 comprises a CPU, a RAM, and a ROM, a dedicated IC chip, or the like, and executes designated arithmetic operations.

If it is determined in step S153a, as a result of verification, that the digital signature is invalid, the processing is aborted. Otherwise, the IC card 112 calculates $BBj=X^{\wedge}(B \times bj)$ by the arithmetic unit 143 and sends it to the camera (step S154a). The random number bj, BBj, ABj, the public key certificate, and the values used in the process of calculating them are cleared from the memory after the processing in step S154a.

Note that it is computationally difficult to calculate B from BBj and bj. Also, note that BBj is a value obtained from the secret information B and the random number bj, and cannot be calculated from only the secret information B commonly held by all the IC cards 112.

Next, the camera 111 calculates a key $Kij=BBj^{\wedge}Ai$ and $BAij=X^{\wedge}(bj \times Ai)$ from the received BBj using the arithmetic unit 123 (step S154b).

Note that the key Kij is a function of B, bj, A, and ai. Therefore, note that the key Kij cannot be calculated from only the secret information A commonly held by all the cameras and the secret information B commonly held by all the IC cards. Also, note that BAij is a function of bj, A, and ai, and the key Kij cannot be calculated from BAij unless arbitrary information associated with the secret information B can be acquired.

The camera then controls the digital signature generation unit 130 to calculate a digital signature for BAij using the secret key di (step S155b). The camera controls the MAC generation unit 128 to generate a MAC for the image D using the key Kij (step S156b). At this time, the MAC is obtained by compressing the image D by the hash generation unit 127, and applying a calculation to the compressed value using the key Kij by the MAC generation unit 128.

Note that the image D is an image file which is obtained by compressing an image captured by the image capturing unit 125 and outputting it in a format such as JPEG or the like by the image file generation unit 126. Also, the file format of the image file to be generated by the image file generation unit 126 may be any of JFIF (JPEG File Interchange Format), TIFF (Tagged Image File Format), and GIF (Graphics Interchange Format), their expanded formats, or other image file formats.

As a hash function H used in the hash generation unit 127, MD5, SHA1, RIPEMD, and the like are generally known.

As the MAC data generation algorithm in the MAC generation unit 128, a method of using a CBC (Cipher Block Chaining) mode of symmetric-key cryptography such as DES, AES, or the like, and a method of using a keyed hash function called HMAC are known. In case of the CBC mode of DES, a method of encrypting target data in the CBC mode, and defining first 32 bits of its last block as MAC data may be used.

Next, the camera 111 appends the MAC, BAij, and the digital signature for BAij to the image D (image file) generated by the image file generation unit 126 (step S157b). Hence, the image file includes at least the image D and the MAC, BAij used in verification, and the digital signature for BAij. Finally, the camera 111 clears the received data other than those appended to the image file, and the generated data from a memory used in temporary storage (step S158b).

The respective processes in the camera are controlled by the control unit 129, and those in the IC card are controlled by the control unit 147.

Figure 15:
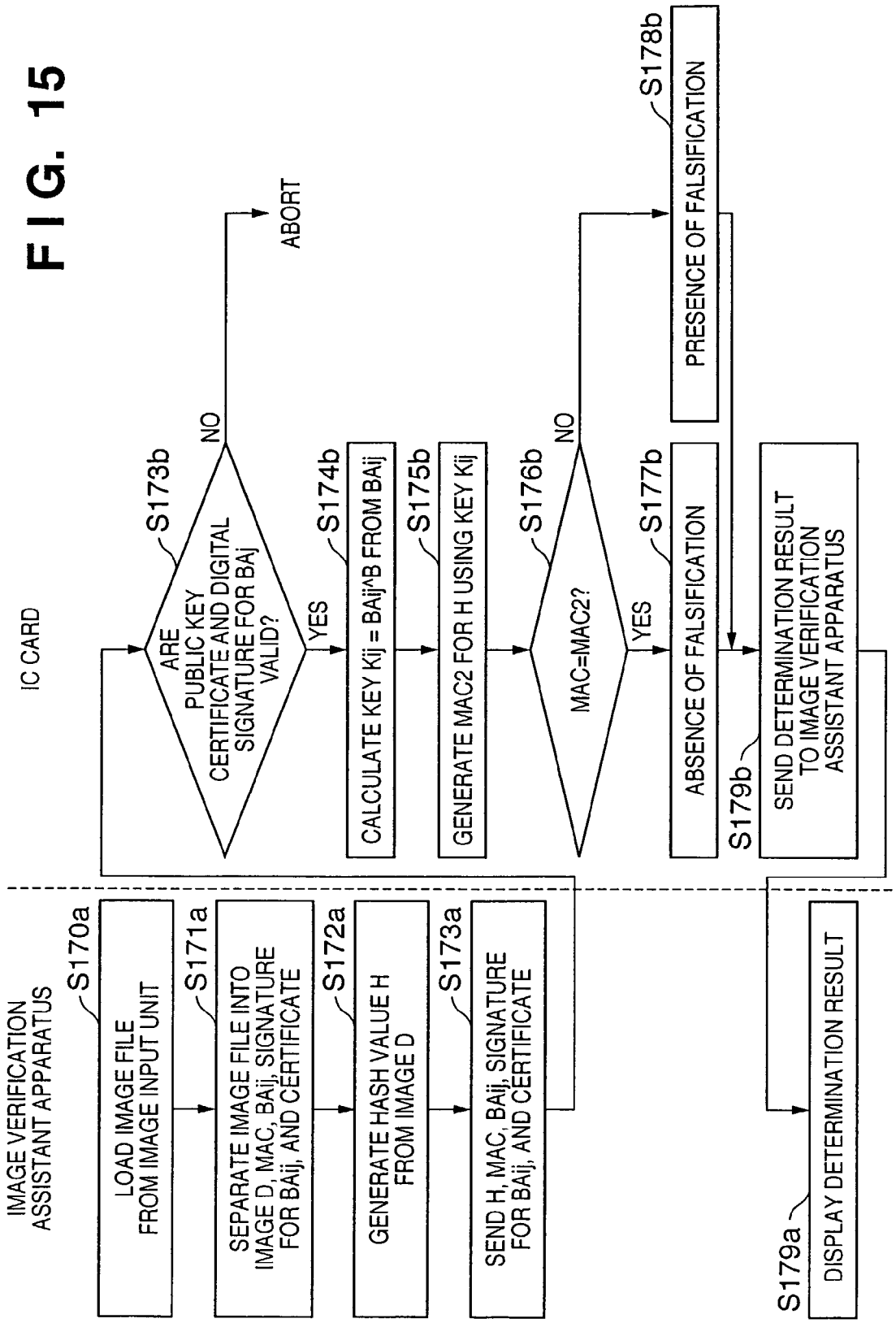
FIG. 15 is a flowchart for explaining MAC verification processing according to the fifth embodiment.

MAC verification processing will be described below using FIG. 15. The MAC verification processing is executed by the PC (image verification assistant apparatus) 113 and the IC card (attack resistant apparatus) 112 shown in FIG. 11.

The PC 113 loads the image file which includes the image D and the MAC, BAij used in verification, and the digital signature from an image input unit (not shown: including the communication unit 61) (step S170a). For example, when the image file is loaded via a network, the image input unit is a network interface or the like.

The PC 113 controls the image file separation unit 62 to separate the loaded image file into the image D and MAC, BAij used in verification, the digital signature for BAij, and the public key certificate (step S171a). Next, the PC 113 generates a hash value H from the image D using the hash generation unit 63 (step S172a).

The PC 113 sends the generated hash value H, and the separated MAC, BAij used in verification, the digital signature for BAij, and the public key certificate to the IC card 112 using the communication unit 61 (step S173a).

Since the image verification assistant apparatus 113 is the PC, the communication unit 61 is an I/O with the IC card or the like, and the image file separation unit 62 and hash generation unit 63 can be implemented by the CPU, RAM, ROM, and the like.

Next, the IC card 112 controls the digital signature verification unit 148 to verify the received public key certificate and the digital signature for BAij (step S173b). This verification sequence is the same as that in the processing executed in step S153a.

If the public key certificate and the digital signature for BAij are invalid (NO in step S173b), the IC card 112 aborts processing. Otherwise (YES in step S173b), the flow advances to step S174b, and the IC card 112 calculates a verification key $Kij=BAij^{\wedge}B=X^{\wedge}(B \times bj \times Ai)$ from the received BAij using the arithmetic unit 143 (step S174b). Note that the key Kij becomes equal to Kij generated by the processing in step S154b only when the received BAij is equal to BAij generated by the processing in step S154b.

The IC card 112 controls the MAC generation unit 145 to generate MAC2 corresponding to the received hash value H using the key Kij (step S175b). The IC card 112 then controls the determination unit 146 to compare the generated MAC2 and the received MAC (step S176b). If MAC=MAC2, the IC card 112 determines the absence of falsification (step S177b); otherwise, it determines the presence of falsification (step S178b).

As is known, it is computationally difficult for the MAC generation algorithm to calculate MAC2 that determines the absence of falsification for falsified image data D' without knowing the key Kij. Furthermore, note that Kij=BAij^B cannot be calculated unless information associated with the secret information B is acquired.

The IC card 112 then sends the result to the PC 113 using the communication unit 144 (step S179b). Note that the MAC generation algorithm of the MAC generation unit 145 is the same as that of the MAC generation unit 128 of the camera 112, and performs calculations using symmetric-key cryptography such as DES, AES, or the like. The determination unit 146 can be implemented by the CPU and the like.

Finally, the PC 113 displays the received result using the display unit 65 such as a monitor or the like (step S179a). More specifically, if the determination unit 146 determines the absence of falsification, a message "not falsified" or the like is displayed; if it determines the presence of falsification, a message "falsified" or the like is displayed.

The aforementioned processes in the PC 113 are controlled by the control unit 66 of the PC 113, and the processes in the IC card 112 are controlled by the control unit 147 of the IC card 112.

As described above, in this embodiment, since the secret information set for the camera 111 in the production process by the vendor is common to all the cameras 111, the production process is never complicated. Furthermore, when the secret information of the camera 111 is individualized by a user's setting, since verification information is generated using the individualized secret information, other cameras are not damaged even if information of one camera 111 is leaked. Note that the user's setting is realized by a simple operation on the operation unit 122, and the user need only make this operation. Since information commonly set for all the cameras 111 is managed in secret, the user cannot know it and, hence, it is difficult for the user to falsify image data.

In this embodiment, the secret information is individualized by the user's setting, but it need always be individualized. If the individualizing processing is skipped, the production process of the vendor is never complicated, it is difficult for the user to falsify image data, and the number of processes in the camera can be reduced.

Also, since the secret information set for the IC card 112 in the production process by the vendor is common to all the IC cards 112, the production process is never complicated. Also, the predetermined IC card 112 can be used to generate verification information of all the cameras 111 and to verify all pieces of verification information.

As described above, in order to pass verification in step S153a, since the public key certificate which can be acquired by only the valid user, and the secret information A that can be calculated from only the camera 111 which is duly produced by the vendor are required, it is guaranteed that an image that passes verification of step S176b is generated by the valid camera 111 which is set by the valid user.

Sixth Embodiment

The fifth embodiment has explained the arrangement of the camera 111 which performs the modular exponentiation arithmetic operation (steps S151b, S154b, and the like). However, the modular exponentiation arithmetic operation requires high arithmetic performance in general. Hence, this embodiment will explain an arrangement that allows the camera 111 to generate verification data (including MAC) even when the IC card 112 has a high arithmetic function associated with security but the arithmetic function of the camera 111 is not so high. Note that the image generation apparatus 111, attack resistant apparatus 112, and image verification assistant apparatus 113 of this embodiment have the same arrangements as those described in the fifth embodiment, and a description thereof will be omitted.

In the arrangement of this embodiment, the secret key distribution process for a digital signature to each user shown in FIG. 17 is skipped. Hence, no registration station 114 is required, and the system of this embodiment comprises the apparatuses shown in FIG. 1 as in the first embodiment. As for the reference symbols of the respective apparatuses, that of the camera (image generation apparatus) is read as 111, that of the IC card (attack resistant apparatus) is read as 112, and that of the PC (image verification assistant apparatus) is read as 113. Also, in this embodiment, the respective apparatuses need not have communication and processing functions with the registration station 114 in the fifth embodiment.

Figure 18:
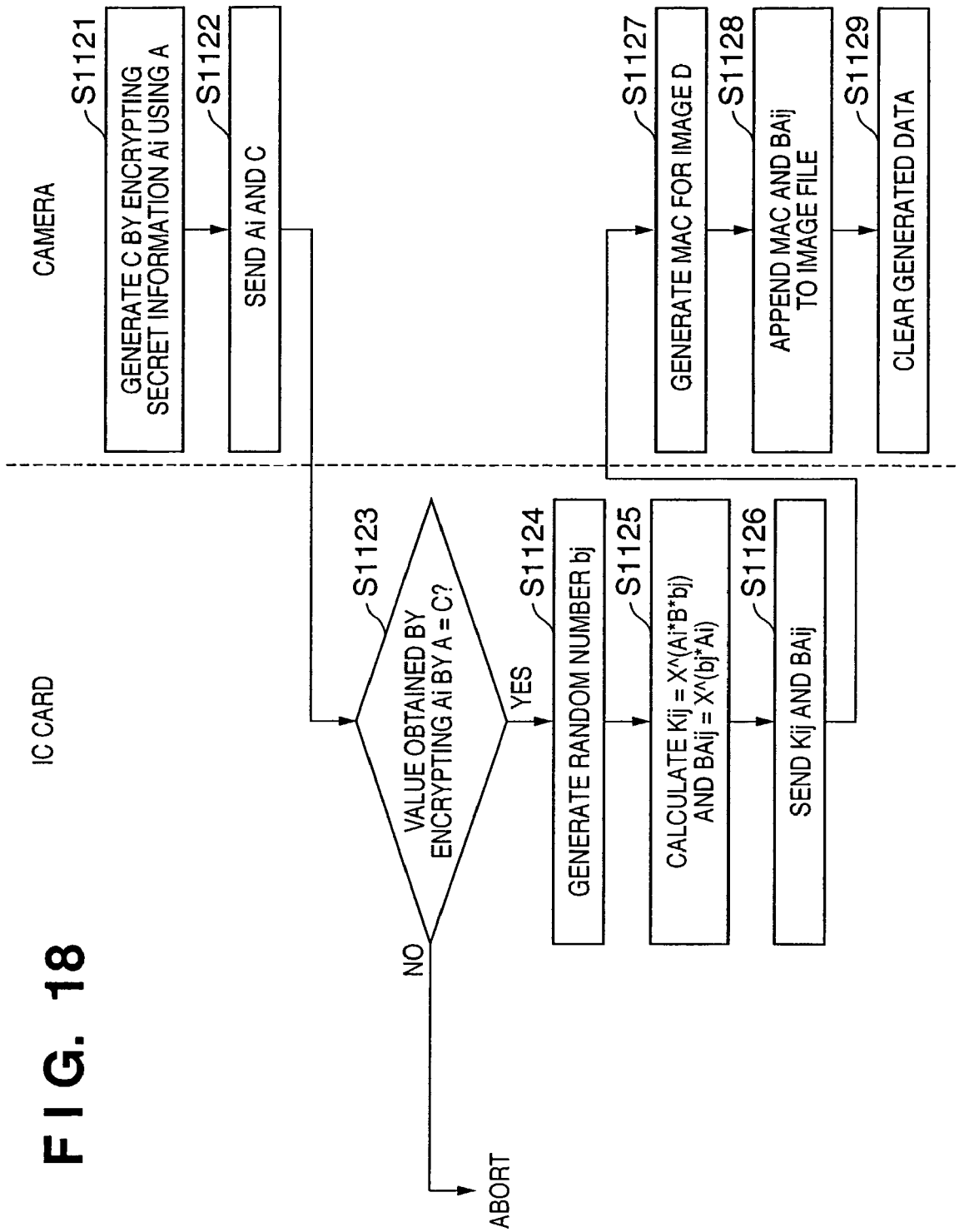
FIG. 18 is a flowchart for explaining MAC generation processing according to the sixth embodiment.

Furthermore, the arithmetic units 123 and 143 of the camera 111 and the IC card 112 comprise an encryption function using the symmetric-key cryptography. The IC card 112 is set with secret information A commonly set for all the cameras in the production process. With the above arrangement, the MAC generation processing and the MAC verification processing shown in FIGS. 14 and 15 can be modified, as shown in FIGS. 18 and 7 (assume that the key individualizing processing is executed in the same manner as in the first embodiment (FIG. 3)).

The MAC generation processing will be described first using FIG. 18.

The camera 111 controls the arithmetic unit 123 to encrypt secret information Ai using initially set A as a key to generate ciphertext C (step S1121). Note that encryption can be implemented by known block encryption such as DES, AES, or the like. Next, the camera 111 sends Ai and the calculated C to the IC card 112 using the communication unit 124 (step S1122).

The IC card 112 controls the arithmetic unit 144 to encrypt the received Ai using the set A by the same block encryption as in the camera 111 to check if the encrypted C matches the received C (step S1123). If they do not match (NO in step S1123), the IC card 112 aborts processing; otherwise (YES in step S1123), the flow advances to step S1124.

Note that only when the camera 111 encrypts Ai using the secret information A, the value obtained by encrypting Ai using A by the IC card 112 matches C. Since only the camera 111 which is duly produced by the vendor has the secret information A, a camera which is not duly produced cannot advance its processing any more.

In step S1124, the IC card 112 controls the random number generation unit 142 to generate a random number bj. Next, the IC card 112 controls the arithmetic unit 143 to calculate Kij=X^(Ai×B×bj) and BAij=X^(bj×Ai) (step S1125). The IC card 112 sends the generated Kij and BAij to the camera 111 using the communication unit 144 (step S1126). After Kij and BAij are output, the IC card 112 clears Ai, bj, Kij, and BAij, and values used in the process of calculating them from a memory.

The camera 111 controls the MAC generation unit 128 to generate a MAC for an image D using the key Kij (step S1127). At this time, the MAC is calculated by compressing the image D by the hash generation unit 127, applying a calculation to the compressed value using the key Kij, and so forth as in the fifth embodiment.

The camera 111 appends the MAC and BAij to the image file of the image D by the image file generation unit 126 (step S1128). Finally, the camera 111 clears the received BBj and Bj and the generated key Kij (step S1129).

Note that the processes in the camera 111 are controlled by the control unit 129 of the camera 111 and those in the IC card 112 are controlled by the control unit 147 of the IC card 112 as in the fifth embodiment.

Note that the MAC verification processing is done based on the flowchart of FIG. 7 as in the first embodiment, and a description thereof will be omitted. Note that the reference symbols of the PC 113, the IC card 112, the arithmetic unit 143, the MAC generation unit 145, the communication unit 144, the determination unit 146, and the like are read as corresponding ones, as needed.

In this way, the same processing as in the fifth embodiment can be done without imposing any load on the camera 111 (without making any modular exponentiation arithmetic operation in this embodiment).

Seventh Embodiment

The seventh embodiment will be described below. In the fifth and sixth embodiments, a case has been explained wherein the MAC data generation processing is applied to only image data of an object. However, MAC data can be generated by the same scheme as image data for information corresponding to meta data of image data such as auxiliary parameters (for example, an image capturing time, focal length, aperture value, ISO speed, photometry mode, image file size, photographer information, etc.), and the MAC verification processing can be similarly implemented for such auxiliary parameters. Note that the image generation apparatus 111, the attack resistant apparatus 112, and the image verification assistant apparatus 113 of this embodiment have the same arrangements as those described in the fifth embodiment, and a description thereof will be omitted.

Since both image data and meta data are binary data, this processing can be implemented by substituting image data by meta data, i.e., switching input to the hash generation unit 127 from image data to meta data. This data switching is realized by the control unit 129.

Figure 16:
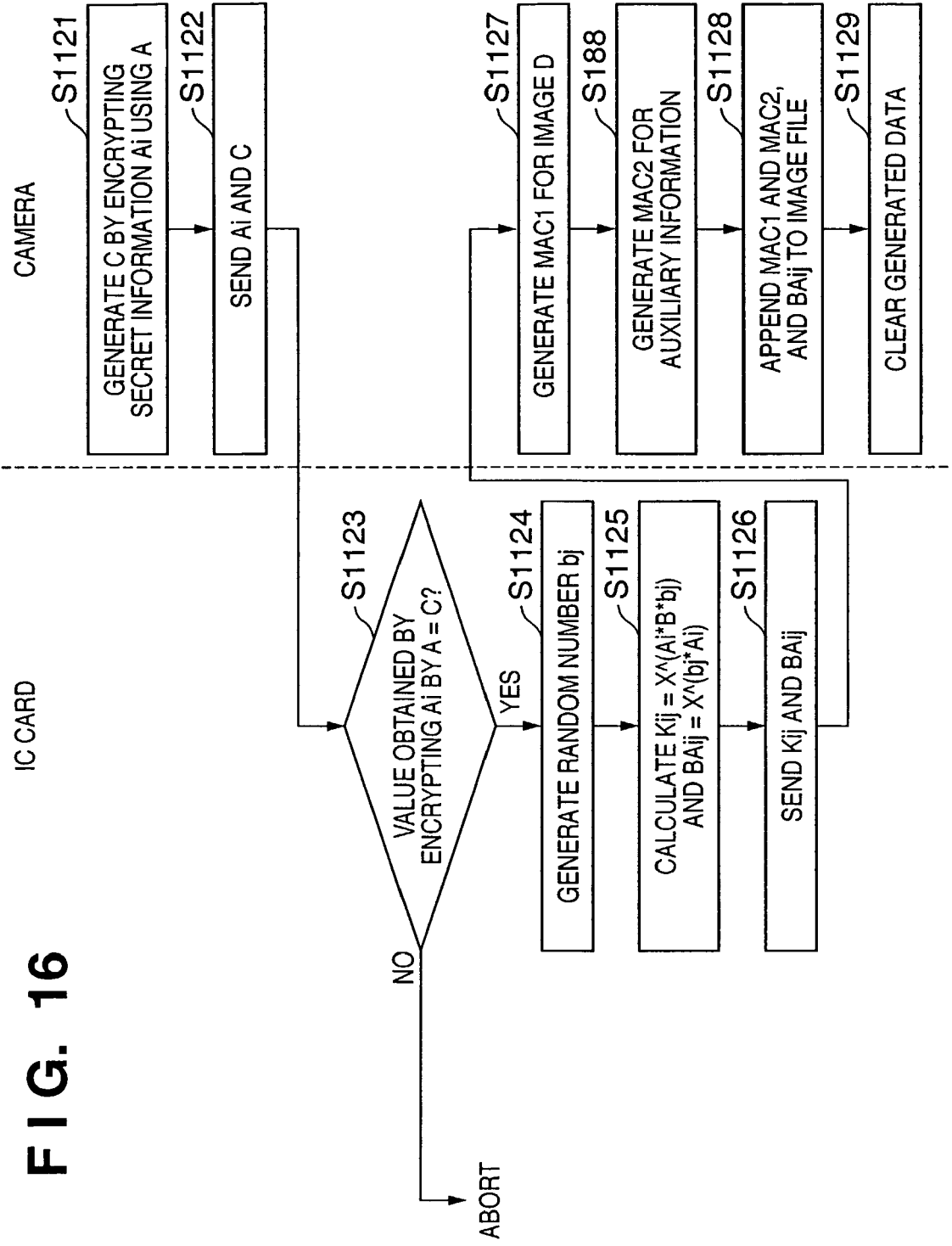
FIG. 16 is a flowchart for explaining MAC generation processing according to the seventh embodiment.

FIGS. 16 and 9 show the sequences of this embodiment. FIG. 16 is a flowchart of processing corresponding to FIG. 18, and is obtained by adding the MAC generation processing of auxiliary parameters to the flowchart of FIG. 18 after step S1127.

FIG. 9 is the same as the flowchart as that in the third embodiment.

By implementing the above arrangement, falsification of not only image data but also meta data associated with an image can be detected. Also, in FIG. 16, it is guaranteed that data to be generated is generated by the camera 111 which is produced duly.

Note that the arrangement described as the seventh embodiment can be that obtained by further comprising an arrangement for generating verification information associated with meta data that pertain to an image, in addition to the arrangement of the sixth embodiment. Also, the arrangement of the fifth embodiment can further comprise such arrangement. That is, the same function can be provided by generating a MAC not only for the image D but also for auxiliary information of the image in step S156b in FIG. 14.

Other Embodiments

The preferred embodiments according to the present invention have been described. However, the present invention is not limited to the aforementioned arrangement.

For example, in the fifth and sixth embodiments, the MAC verification processing has been explained while its processes are separated into the image verification assistant apparatus 113 (PC) and attack resistant apparatus 112 (IC card) in FIG. 11. However, an arrangement using an apparatus which integrates the image verification assistant apparatus 113 and attack resistant apparatus 112 may be adopted. In this case, only an image file can be input from the image generation apparatus 111 to the image verification assistant apparatus 113, the processing in FIGS. 15, 9, and 7 can be done within the single apparatus, and the image verification assistant apparatus 113 and attack resistant apparatus 112 need not be distinguished.

Also, the key individualizing processing is calculated by Ai=A×ai for the sake of simplicity, but it may be calculated as a function of Ai=f(A, ai). More specifically, this calculation is not particularly limited as long as a predetermined arithmetic operation is made to have A and ai as inputs (for example, Ai=A+ai may be used).

In this case, Ai is the result of the arithmetic operation using A and ai. Since A is common secret information determined by the vendor and ai is information that only the user knows, it is noted that a third party (including the vendor) cannot know the value Ai, and the user himself or herself cannot know the value Ai, either.

In each of the above embodiments, the secret information A is information common to all cameras provided by the vendor, and the secret information B is information common to all IC cards provided by the vendor. However, these kinds of information may be changed as needed. For example, different kinds of information may be used for respective models.

The public key certificate in the fifth embodiment is issued by the registration station 114 for the sake of simplicity. Alternatively, a validation station in a general public key infrastructure PKI may issue public key certificate.

Furthermore, in the sixth embodiment, the camera 111 and IC card 112 have symmetric key encryption units in the arithmetic unit and the MAC generation unit. However, these units may be configured as a commonized and downsized device.

In the sixth embodiment, the secret information Ai is encrypted using the initially set information A. However, this secret information and the initially set information need not be Ai and A, and they are not particularly limited as long as they are information set by the user and information unique to the apparatus.

In the description of the fifth to seventh embodiments, image data is used as information to be verified. However, the present invention is not limited to such specific data. More specifically, the present invention can be applied to predetermined digital data such as audio data and moving image data, a document file, and the like.

In the description of the fifth to seventh embodiments, the digital camera is used as the apparatus for generating information to be verified. However, the present invention is not limited to such specific apparatus. For example, the present invention can be applied to a predetermined information processing apparatus such as a voice recorder, a digital video camera, a portable phone, a PC, and the like.

The preferred embodiments of the present invention have been explained, and the present invention can be practiced in the forms of a system, apparatus, method, program, storage medium, and the like. Also, the present invention can be applied to either a system constituted by a plurality of devices, or an apparatus consisting of a single equipment.

Note that the present invention includes a case wherein the invention is achieved by directly or remotely supplying a program of software that implements the functions of the aforementioned embodiments to a system or apparatus, and reading out and executing the supplied program code by a computer of that system or apparatus.

Therefore, the program code itself installed in a computer to implement the functional process of the present invention using the computer constitutes the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a Floppy® disk, a hard disk, an optical disk, a magnetooptical disk, an MO, a CD-ROM, a CD-R, a CD-RW, magnetic tape, a nonvolatile memory card, a ROM, a DVD (DVD-ROM, DVD-R), and the like may be used.

As another program supply method, the program may be supplied by establishing a connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional process of the present invention by the computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As described above, according to the present invention, a technique that can make falsification difficult while minimizing the load on the vendor and user's operations can be provided.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-314717 filed on Oct. 28, 2004 and Japanese Patent Application No. 2004-314718 filed on Oct. 28, 2004, the entire contents of which are hereby incorporated by reference herein.

The invention claimed is:

1. An information processing system comprising:
first and second data processing apparatuses,
wherein said first data processing apparatus comprises:
a first holding unit configured to hold first common secret information which is set in advance in said first data processing apparatus wherein the first common secret information is common to another first data processing apparatus;
an inputting unit configured to input user secret information unique to a user;
a first calculation unit configured to calculate first unique secret information from the first common secret information and the user secret information, wherein the first unique secret information is unique to the first data processing apparatus;
a first reception unit configured to receive information associated with second secret information and first key derivation auxiliary information from said second data processing apparatus, wherein the first key derivation auxiliary information is calculated from a random number using modular exponentiation, and wherein the information associated with the second secret information is calculated from the second secret information and the random number using modular exponentiation;
a key information generation unit configured to generate key information on the basis of the first unique secret information and the information associated with the second secret information using modular exponentiation;
a key derivation auxiliary information generation unit configured to generate a second key derivation auxiliary information which allows said second data processing apparatus to derive the key information from the second secret information, wherein the second key derivation auxiliary information is generated from the first key derivation auxiliary information and the first unique secret information using modular exponentiation;
a first verification information generation unit configured to generate first verification information by encrypting information to be verified using the key information; and
an output unit configured to output the information to be verified, the first verification information, and the second key derivation auxiliary information, to said second data processing apparatus; and
wherein said second data processing apparatus comprises:
a holding unit configured to hold the second secret information which is set in advance in said second data processing apparatus, wherein the second secret information is common to another second data processing apparatus;
a second reception unit configured to receive the information to be verified, the first verification information, and the second key derivation auxiliary information from said first data processing apparatus;

a key information derivation unit configured to derive the same key information as the key information generated by said key information generation unit on the basis of the second secret information and the second key derivation auxiliary information using modular exponentiation;

a second verification information generation unit configured to generate second verification information by encrypting the information to be verified using the key information derived by said key information derivation unit; and a falsification detection unit configured to detect the falsification of the information to be verified and the absence of falsification of the information to be verified by comparing the first verification information with the second verification information.

2. A data processing method in an information processing system including first and second data processing apparatuses, comprising steps of:

at the first data processing apparatus,
holding first common secret information which is set in advance in the first data processing apparatus, wherein the first common secret information is common to another first data processing apparatus;

inputting user secret information unique to a user;

calculating first unique secret information from the first common secret information and the user secret information, wherein first unique secret information is unique to the first data processing apparatus;

receiving information associated with second secret information and first key derivation auxiliary information from the second data processing apparatus, wherein the first key derivation auxiliary information is calculated from a random number using modular exponentiation, and wherein the information associated with the second secret information is calculated from the second secret information and the random number using modular exponentiation;

generating key information on the basis of the first unique secret information and the information associated with the second secret information using modular exponentiation;

generating second key derivation auxiliary information which allows the second data processing apparatus to derive the key information from the second secret information, wherein the second key derivation auxiliary information is generated from the first key derivation auxiliary information and the first unique secret information using modular exponentiation;

generating first verification information by encrypting information to be verified using the key information; and outputting the information to be verified, the first verification information, and the second key derivation auxiliary information, to the second data processing apparatus;

and at the second data processing apparatus,
holding the second secret information which is set in advance in the second data processing apparatus, wherein the second secret information is common to another second data processing apparatus;

receiving the information to be verified, the first verification information, and the second key derivation auxiliary information from the first data processing apparatus;

deriving the same key information as the key information generated by the first data processing apparatus on the basis of the second secret information and the second key derivation auxiliary information using modular exponentiation;

generating second verification information by encrypting the information to be verified using the key information derived by said deriving step; and detecting falsification of the information to be verified and the absence of falsification of the information to be verified by comparing the first verification information with the second verification information.

3. The system according to claim 1,
wherein said first data processing apparatus further comprises: an acquisition unit configured to output validity information used to prove the validity of said first data processing apparatus, and wherein said first reception unit is configured to receive the information associated with the second secret information in accordance with contents of the validity information.

4. The system according to claim 3, wherein the validity information is obtained in correspondence with the first unique secret information.

5. The system according to claim 3, wherein the validity information is information based on a digital signature scheme or a symmetric-key cryptography scheme.

6. The system according to claim 1, wherein the user secret information is information acquired by an external input.

7. The system according to claim 1, wherein the user secret information is information acquired by random number generation.

8. The system according to claim 1, wherein the information associated with the second secret information is information obtained from the second secret information by a predetermined arithmetic operation.

9. The system according to claim 1, wherein said first data processing apparatus further comprises an image capturing unit, and wherein image data captured by said image capturing unit is generated as the information to be verified.

* * * * *